United States Patent
Sengupta et al.

(10) Patent No.: US 11,422,863 B2
(45) Date of Patent: Aug. 23, 2022

(54) ATTACHED ACCELERATOR SCALING

(71) Applicant: Amazon Technologies, Inc., Seattle, WA (US)

(72) Inventors: Sudipta Sengupta, Redmond, WA (US); Poorna Chand Srinivas Perumalla, Seattle, WA (US); Dominic Rajeev Divakaruni, Seattle, WA (US); Nafea Bshara, Cupertino, CA (US); Leo Parker Dirac, Seattle, WA (US); Bratin Saha, Cupertino, CA (US); Matthew James Wood, Seattle, WA (US); Andrea Olgiati, Gilroy, CA (US); Swaminathan Sivasubramanian, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1082 days.

(21) Appl. No.: 16/020,810

(22) Filed: Jun. 27, 2018

(65) Prior Publication Data

US 2020/0004597 A1 Jan. 2, 2020

(51) Int. Cl.
*G06F 9/50* (2006.01)
*G06N 5/04* (2006.01)
(Continued)

(52) U.S. Cl.
CPC .......... *G06F 9/5044* (2013.01); *G06F 9/3877* (2013.01); *G06F 9/45558* (2013.01);
(Continued)

(58) Field of Classification Search
CPC .. G06F 9/5044; G06F 9/3877; G06F 9/45558; G06F 2009/4557;
(Continued)

(56) References Cited

U.S. PATENT DOCUMENTS 10,262,390 B1   4/2019   Sun et al.
11,003,992 B2   5/2021   Wesolowski et al.
(Continued)

FOREIGN PATENT DOCUMENTS

JP   2011524049 A   8/2011

OTHER PUBLICATIONS

Non-Final Office Action for related U.S. Appl. No. 16/020,819, dated Sep. 2, 2021, 17 pages.
(Continued)

*Primary Examiner* — Michael A Keller
(74) *Attorney, Agent, or Firm* — Nicholson De Vos Webster & Elliott, LLP

(57) ABSTRACT

Implementations detailed herein include description of a computer-implemented method. In an implementation, the method at least includes provisioning an application instance and portions of at least one accelerator attached to the application instance to execute a machine learning model of an application of the application instance; loading the machine learning model onto the portions of the at least one accelerator; receiving scoring data in the application; and utilizing each of the portions of the attached at least one accelerator to perform inference on the scoring data in parallel and only using one response from the portions of the accelerator.

17 Claims, 20 Drawing Sheets

(51) Int. Cl.
G06F 9/455 (2018.01)
G06F 9/38 (2018.01)
G06N 20/00 (2019.01)
(52) U.S. Cl.
CPC .............. *G06N 5/04* (2013.01); *G06N 20/00* (2019.01); *G06F 2009/4557* (2013.01); *G06F 2009/45583* (2013.01); *G06F 2009/45595* (2013.01)
(58) Field of Classification Search
CPC . G06F 2009/45583; G06F 2009/45595; G06F 9/5022; G06F 2209/509; G06F 9/5027; G06N 5/04; G06N 20/00; G06N 3/08
See application file for complete search history.

(56) References Cited

U.S. PATENT DOCUMENTS

| | | | |
|---|---|---|---|
| 2011/0134761 | A1 | 6/2011 | Smith et al. |
| 2012/0069032 | A1 | 3/2012 | Hansson et al. |
| 2012/0254868 | A1 | 10/2012 | Hansson et al. |
| 2014/0019656 | A1 | 1/2014 | Hum et al. |
| 2017/0132746 | A1* | 5/2017 | Wilt ..................... G06F 9/5077 |
| 2017/0195173 | A1 | 7/2017 | Izenberg et al. |
| 2017/0220949 | A1 | 8/2017 | Feng et al. |
| 2018/0052709 | A1 | 2/2018 | Fong et al. |
| 2018/0322383 | A1 | 11/2018 | Feng et al. |
| 2019/0005606 | A1 | 1/2019 | Yang |
| 2019/0086988 | A1* | 3/2019 | He ..................... G06F 1/3212 |
| 2019/0114537 | A1 | 4/2019 | Wesolowski et al. |
| 2019/0286973 | A1 | 9/2019 | Kovvuri et al. |
| 2021/0216375 | A1 | 7/2021 | Sivaraman et al. |

OTHER PUBLICATIONS

European Communication pursuant to Article 94(3) for related EP Application No. 19737407.7, dated Jun. 24, 2021, 10 pages.
Silla et al. "Remote GPU Virtualization: Is it useful?", Mar. 2016, In 2016 2nc IEEE International Workshop on High-Performance Interconnection Networks in the Exascale and Big-Data Era (HiPINEB), pp. 41-48, 2016.
Final Office Action for U.S. Appl. No. 16/020,819, dated Dec. 14, 2020, 21 pages.
Fahmy, Suhaib A. et al.; "Virtualized FPGA Accelerators for Efficient Cloud Computing"; 2015 IEEE 7th International Conference on Cloud Computing Technology and Science; IEEE; Nov. 30, 2015, 6 pages.
International Search Report and Written Opinion for related International Application No. PCT/US2019/038670, dated Aug. 29, 2019, 16 pages.
Chen et al., "TVM: End-to-End Optimization Stack for Deep Learning", Dec. 2017 https://dada.cs.washingto.edu/research/tr/2017/12/UW-CSE-17-12-01.pdf (Year:2017).
Ukidave et al., "Mystic: Predictive Scheduling for GPU Based Cloud Servers Using Machine Learning", 2016 https://ieeexplore.ieee.org/abstract/document/7516031 (Year:2016).
Wang et al., "Real-time meets approximate computing: An elastic CNN inference accelerator with adaptive trade-off between QoS and QoR", 2017 https://ieeexplore.ieee.org/abstract/document/8060406 (Year:2017).
Non-Final Office Action for U.S. Appl. No. 16/020,788, dated Jun. 8, 2021, 55 pages.
Jain, Paras, et al. "Dynamic Space-Time Scheduling for GPU Inference" 32nd Conference on Neural Information Processing Systems (NeurIPS 2018), Montreal, Canada, pp. 1-8 (Year: 2018).
Non-Final Office Action, U.S. Appl. No. 16/020,819, dated Mar. 30, 2020, 16 pages.
Kapre et al., "Survey of Domain-Specific Languages for FPGA Computing", 2016 26th International Conference on Field Programmable Logic and Application (FPL), Sep. 29, 2016, 12 pages.
Koya et al., "Abuta Bear Bear Proposal of System Software Flow OS", Information Processing Society Research Report Low Performance Computing (HPC) 2018-HPC-2 (online), Information Processing Society, Jan. 21, 2018, 16 pages.
Koya et al., "The Concept for the System Software Flow OA Which Outside Turned to Realization of Four Persons and a Different-Species A.I. Artificial Intelligence Engine Integrated Cloud", Information Processing Society of Japan Research Report System Software and Operating System (OS) 2017-OS-139 (online). Information Processing Society, 2017, 14 pages.
Putnam et al., "A Reconfigurable Fabric for Accelerating Large-Scale Datacenter Services." 2014 ACM/IEEE 41st International Symposium on Computer Architecture (ISCA), IEEE, 2014, 12 pages.
Venigineer et al., "Research of the Latest Artificial Intelligence TensorFlow Watch 2018", Interface, CQ Publishing Co. Ltd., vol. 44, No. 8, 13 pages.
Examination Report, AU Application No. 2019295631, dated Oct. 7, 2021, 4 pages.
Examination Report, AU Application No. 2019295631, dated Jan. 11, 2022, 3 pages.
Summons to Attend Oral Proceedings Pursuant to Rule 115(1) EPC, EP Application No. 19737407.7, Dec. 15, 2021, 14 pages.
Notice of Reasons for Refusal, JP Application No. 202080031998, dated Mar. 15, 2022, with translation, 11 pages.
International Preliminary Report on Patentability, International Application No. PCT/US2019/038670, dated Jan. 7, 2021, 8 pages.
Final Office Action for U.S. Appl. No. 16/020,788, dated Jan. 26, 2022, 64 pages.
Final Office Action for U.S. Appl. No. 16/020,819, dated Mar. 24, 2022, 20 pages.

* cited by examiner

ATTACHED ACCELERATOR SCALING

BACKGROUND

As deep learning becomes more prevalent across a range of applications, customers find it challenging and expensive to run in production. Today, customers use GPUs to improve the performance and efficiency of running interference workloads but find it difficult to do so without overprovisioning capacity, which can be wasteful and expensive. The cost of running deep learning inference makes up a significant portion of the overall application infrastructure, and any inefficiency in running these workloads at scale can be cost prohibitive.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for an elastic machine learning service are described. In particular, a slot of an accelerator may be attached to an inference application (an application that includes an inference call) and used as a part of a pipeline of a larger application.

An elastic machine learning/inference (EI) service provides cost efficient hardware acceleration for applications running on a compute instance. The attachment and use are elastic in that an accelerator can be added or removed and with a plurality of choices of precision and/or speed. As such, developers can incorporate hardware acceleration in more places without using a full accelerator (such as an entire graphics processing unit (GPU)). Further, the EI service obscures the underlying hardware through a hardware-independent interface, allowing the service provider to deploy heterogeneous hardware underneath, depending on cost and capabilities, and adjust to the quickly moving deep learning/artificial intelligence hardware landscape. Further, through an EI interface (the attachment of an accelerator slot and/or commands that allow communication between an accelerator slot and an application), a single accelerator chip can be virtualized across multiple inferencing applications (such as customer instances).

As different machine learning workloads have different amounts of pre- and post-processing requirements outside of the core machine learning (ML) function, and the amount of CPU, DRAM, and hardware acceleration resources needed is not the same for each workload. The decoupling of hardware resources needed for machine learning computation efficiency and acceleration provided by the described EI service allows the developer to size the central processing unit (CPU) and memory (such as dynamic random-access memory (DRAM)) independently in a compute instance.

Figure 1:
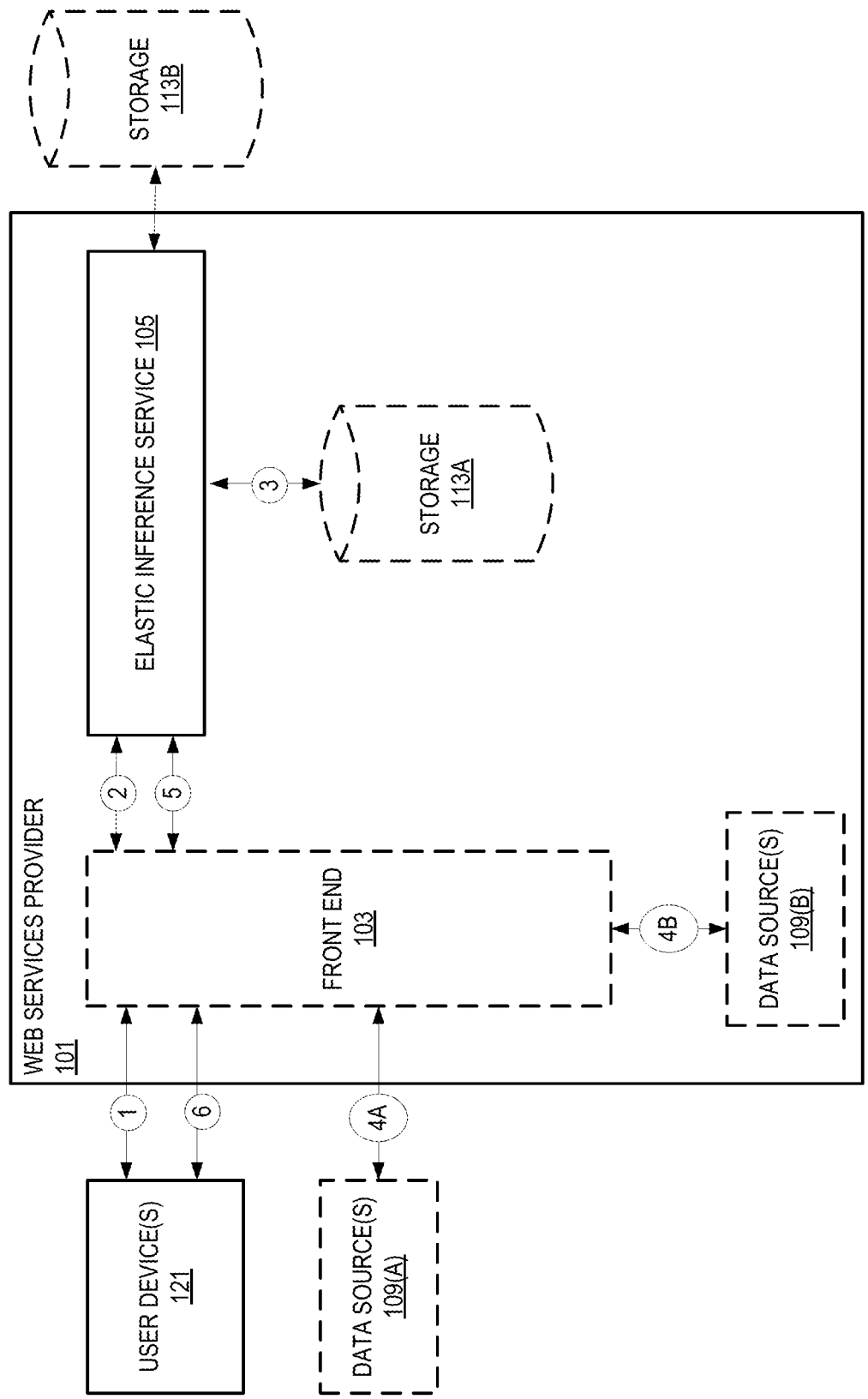
FIG. 1 illustrates embodiments of a system utilizing an elastic inference service.

FIG. 1 illustrates embodiments of a system utilizing an elastic inference service. In the illustration, the elastic inference service 105 is a service provided by a web services provider 101. The web services provider 101 provides multi-tenant compute and/or storage capabilities.

In some embodiments, a front end 103 of the web services provider 101 is a conduit through which users (such as customers) of the web services provider 101 interact with underlying services of the web services provider 101. For example, a user device 121 interacts with the elastic inference service 105 through the front end 103. This interaction may include the configuration of the elastic inference service 105 and receiving results from the elastic inference service 105. Interaction may be through the use of application programming interface (API) calls and/or a command line interface. In some embodiments, there is a direct coupling to the elastic inference service 105. API calls to DescribeElasticInferenceAccelerators; RunInstances; StartInstances; etc. are utilized in some embodiments.

The elastic inference service 105 manages a pool of accelerator appliances running a specific set of software components to deliver an accelerator. The elastic inference 105 is utilized to execute an application that includes at least some portion of code (such as a model) to be executed on an accelerator. These accelerator appliances reside in a service owned virtual network. Internally, an accelerator maps to an accelerator slot, which comprises a fraction of compute resources from the accelerator appliance. An accelerator appliance may host accelerators comprising a plurality of accelerator slots. The number of accelerators slots being hosted on an accelerator appliance depends on the configuration of the accelerator and the configuration of the accelerator appliance.

Users may launch an application instance and request an accelerator to be attached according to a user provided configuration (examples are detailed herein). A control plane of the elastic inference service 105 handles the request to provision at least one accelerator slot and attach one or more slots to the user's application instance. The configuration may dictate particulars of the accelerator slot(s) to use, or the elastic inference service 105 may do so. After the attachment, the accelerator slot(s) is/are accessible from a user's virtual network or via a more direct connection (such as a PCIe connection).

The elastic inference service 105, as noted above, supports multi-tenancy acceleration for machine learning tasks such as inference. Storage 113A and/or 113B is used to store one or more applications including one or more models to be executed on the elastic inference service 105. Applications may be hosted by the elastic inference service 105 as containers or a run as a part of a virtual machine.

Data source(s) 109A and 109B provide scoring data to be processed by the accelerator run by the elastic inference service 105.

In some embodiments, the elastic inference service 105 is on a user device such as user device 121 and not a part of a web services provider 101 offering, however, in the interest of brevity, most of the discussion below uses a web services provider as the example.

The numbered circles illustrate an exemplary flow. At circle 1, a user device 121 communicates to the web services provider 101 a configuration of the elastic inference service 105. In particular, the user device 121 configures the elastic inference service 105 to host an application from storage 113A that includes a model to run on an accelerator that is controlled by the elastic inference service 105.

At circle 2, this configuration is provided to the elastic inference service 105 which connects to the storage 113A at circle 3 to access and load the model and determine if it can be run on an accelerator of the elastic inference service 105. In some embodiments, the elastic inference service 105 also determines how the accelerator should run the model.

At circles 4A or 4B, a data source 109A or 109B provides scoring data to the front end 103. This scoring data is forwarded to the elastic inference service 105 for processing and a result is provided back to the front end 103 at circle 5. The result may also be stored in storage 113A or 113B. Finally, the result is provided to the user device 121 (if requested).

Figure 2:
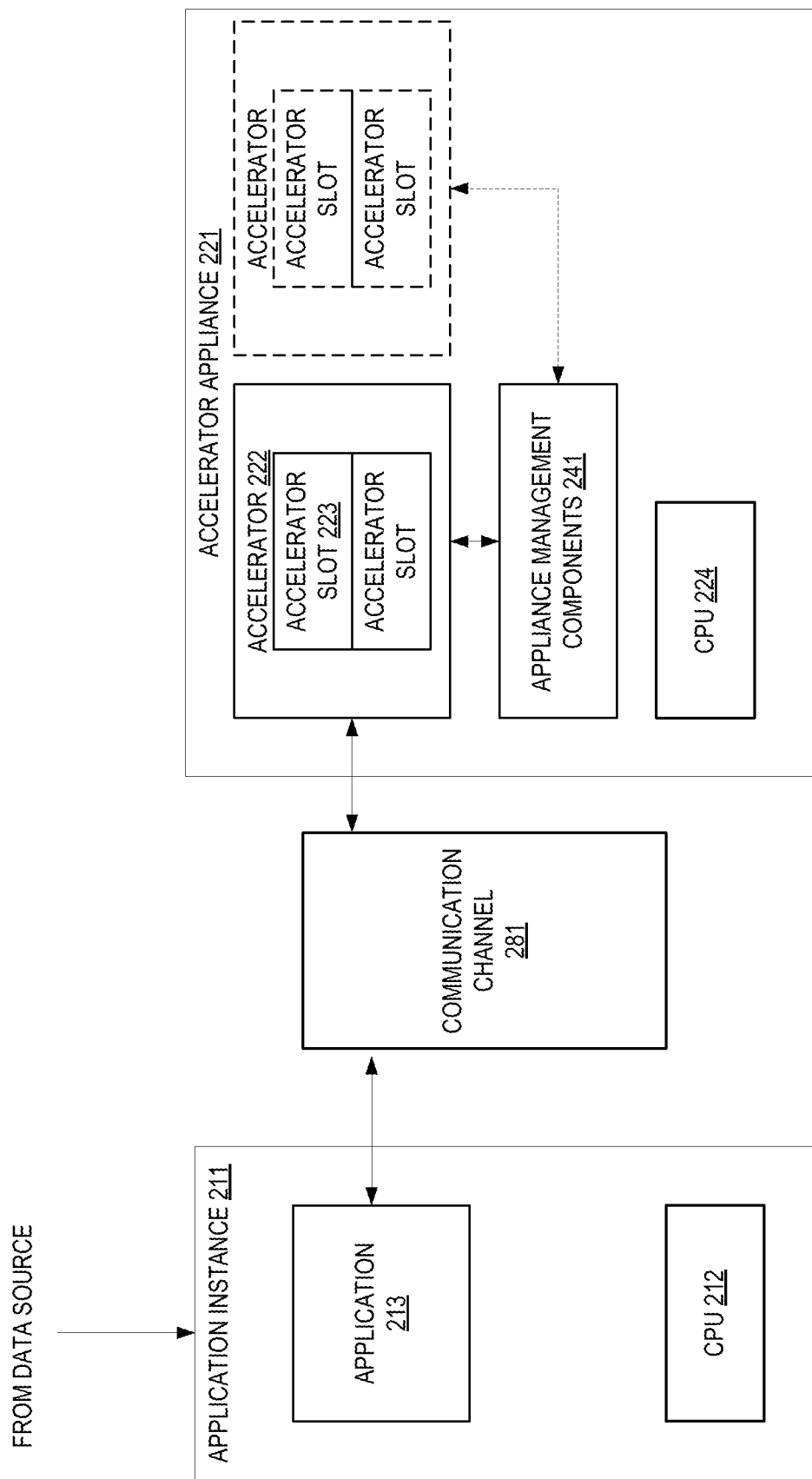
FIG. 2 illustrates embodiments of an elastic inference service.

FIG. 2 illustrates embodiments of an elastic inference service 105. This an elastic inference service 105 may be a part of a web services provider offering, or as an engine on a user device (however, in the interest of brevity as noted above, "service" will be used throughout the application). In particular, what is shown could be considered the data plane of the elastic inference service 105. As shown, the data plane comprises a client component (portion of application instance 211) and a server component (accelerator appliance 221). The client component is delivered as client library implementation installed on the application instance 211. The client library forwards inference calls from the application instance 211 to the remotely attached accelerator appliance 221. In some embodiments, the accelerator appliance 221 receives a tensor from the application instance 211 and returns a tensor.

An application instance 211 is a virtual computing environment that uses a particular configuration of CPU 212, memory, storage, and networking capacity that is to execute an application 213. In some embodiments, the configuration is called an instance type. A template for an application instance (including an operating system) is called a machine image. The application 213 may be called "inference application" below to highlight that a part of the application 213 makes inference calls to at least one accelerator slot. However, the application 213 typically includes other code and the inference call is usually one aspect of an application pipeline.

The instance type that is specified by a user determines the hardware of the host computer to be used for the instance within the web services provider 101. Each instance type offers different compute, memory, and storage capabilities and are grouped in instance families based on these capabilities.

Similarly, an accelerator appliance 221 (another compute instance) uses a particular configuration of CPU 224, memory, storage, and networking capacity that is to execute a machine learning model of application 213. The accelerator appliance 221 additionally has access to one or more accelerators 222. Each accelerator 222 is comprised of one or more accelerator slots 223. In particular, the compute resources of the accelerator appliance 221 are partitioned, allocated, resource governed and isolated across accelerator slots 223 for consistent, sustained performance in a multi-tenant environment. Code executing on the CPU 224 orchestrates the on-board accelerators, runs an inference engine runtime, and offloads computation to the accelerators 222. The resources of an accelerator appliance 221 that could come under contention include the CPU 224, memory, accelerator, accelerator memory, communication channel 281 (such as a direct connection like PCIe or a networked connection), disk, and host-to-interconnect (such as PCIe) bandwidth. An accelerator slot 223 handle the application instance's 211 calls.

Resource governance and isolation may reduce/mitigate interference of requests across accelerator slots 223 through static partitioning of resources across accelerator slots 223 using appliance management components 241. Static partitioning is typically used for the following resource types on an accelerator appliance 221 of CPU cores and memory, accelerator compute and memory, and network bandwidth (at least ingress). However, in some embodiments, dynamic partitioning is utilized such that non-attached slots 223 do not have resources such as memory allocated.

In some embodiments, the CPU 224 resources and disk may be isolated and governed using control groups (cgroups), accelerator resources may be isolated and governed using multi-process service functionality, and network bandwidth may be isolated and governed (such as throttled) using one or more network schedulers. For example, in some embodiments, CPU cores are partitioned across processes using a cpuset mechanism in Cgroups. A small set of cores is shared across the manager/maintenance/health check/logging processes (which are either per accelerator or common to the instance). The remaining portion of the cores are partitioned across the accelerator slots.

For accelerator resources 222, the partitioning of the accelerator slots 223 is dependent on the type of underlying accelerator used. For example, in some embodiments, spatial multiplexing of kernels onto accelerator slots is used.

For a given accelerator slot 223, kernels use a fraction of the hardware available. One way to do this is to make the fraction proportional to the Tera operations/sec. (TOPS) capacity of an accelerator slot 223. For a systolic array-based accelerator temporal multiplexing is used to slot a single tensor processing block, with support for pre-empting long running kernels.

A remotely attached accelerator slot 223 is presented to a user as an elastic inference accelerator, an ephemeral device that is attached to the customers application instance 211 on instance launch to provide inference accelerator capabilities to the instance. Users may associate one or more elastic inference accelerators with an application instance.

For communication channel 281 bandwidth usage, a concern is with ingress bandwidth as large tensors may be sent as input for inference calls (e.g., vision models). Each of n ingress branches should use roughly 1/n of the instance bandwidth (even when all n branch network interfaces are not active). Network schedulers (not shown) on accelerator appliance 221 may be used. Communication between an application instance 211 and an accelerator 221 happens on multiple network connections with each connection being initiated by an application instance 211.

The compute capacity of EI for inference can be scaled up and down in different ways. First, the customer instance and EI attachment can be the auto-scaling unit, as EI attachment is part of launch instance template. Second, the customer can attach multiple EI interfaces, of different precision and TOPS, to a given instance and distribute inference calls across them.

For many networks, inference can be performed using 8-bit integer (INT8) computations without significant impact on accuracy. In the real world, input data is often generated with low precision (or, low dynamic range), hence computation at lower precision does not impact the accuracy of the results. Using low-precision computation allows inference to reduce memory usage, transfer data at higher throughput, deploy larger models, and increase OPS throughput via wide vector instructions. However, training often uses higher precision arithmetic (e.g., FP32) to produce a model that uses high-precision weights. Hence, we need to deal with this gap in precision between the trained model (e.g., FP32) and the capabilities/mode of operation of hardware for inference (e.g., INT8).

In some embodiments, the precision capability of the hardware is exposed to the user and the user is to provide the model in the respective precision. In other embodiments, a conversion from higher precision trained model (FP32) to lower precision inference model is performed. To carry out the quantization in an efficient manner using pre-computed min/max bounds for input tensor/activation/weights, a calibration dataset from the user for that model may be used.

The elastic inference service offers at least two arithmetic precisions of FP32 and FP16. In both cases, in some embodiments, a trained model is provided in FP32 format. Running inference in FP16 mode for FP32 model involves simple type conversion (not quantization).

Figure 3:
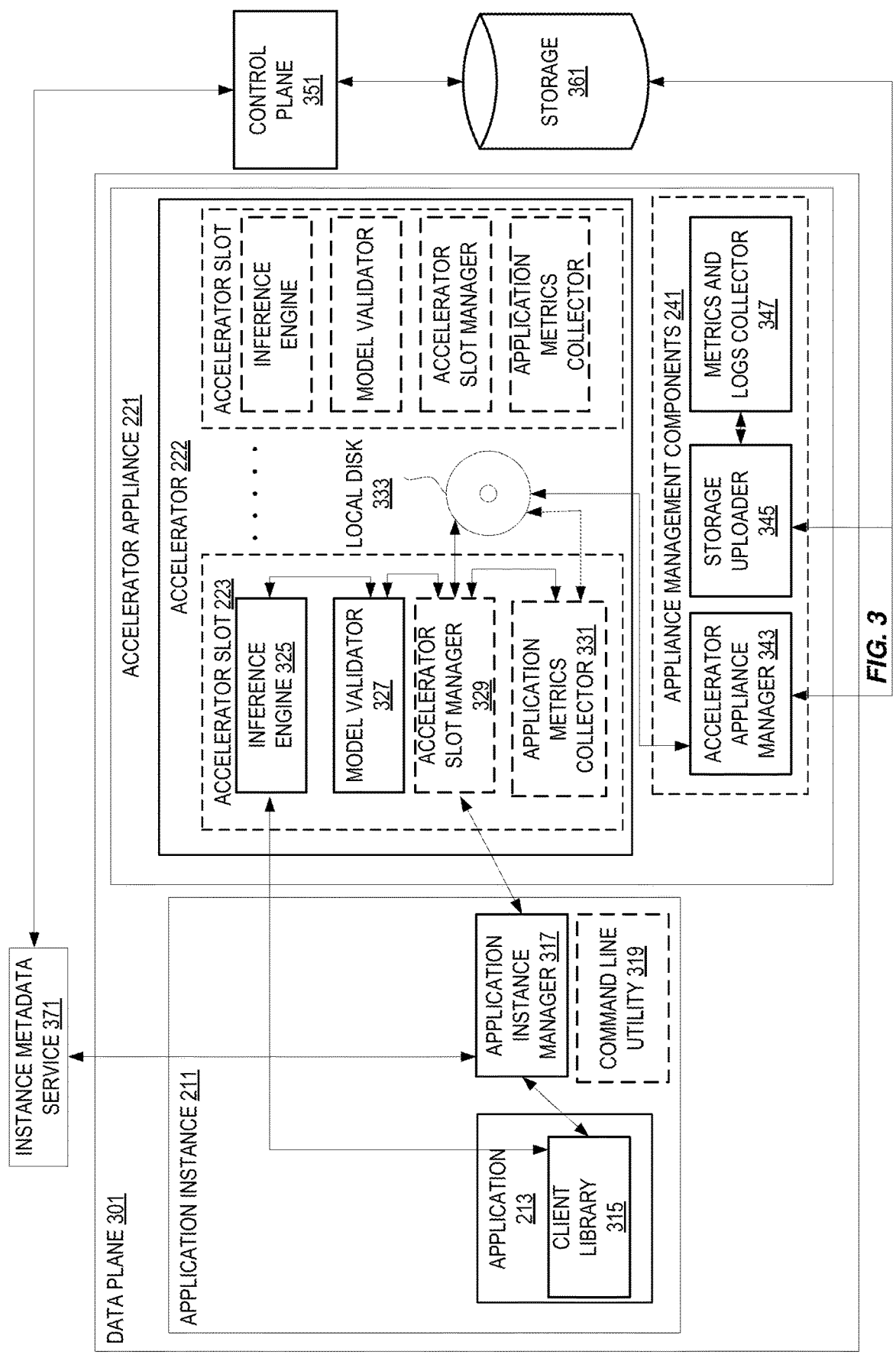
FIG. 3 illustrates embodiments of a system that allows for elastic inference including data plane aspects and control plane aspects.

FIG. 3 illustrates embodiments of a system that allows for elastic inference including data plane aspects and control plane aspects. In some embodiments, the aspects of this system are a part of an elastic inference service. As noted above, a remotely attached accelerator 223 is presented as an elastic inference accelerator (EIA) (or simply accelerator) attached to the user's compute instance. The user's compute instance is labeled as an application instance (AI) 211 and the compute instance which hosts the EIA on the service side is labeled accelerator appliance (AA) 221. Each EIA is mapped to an accelerator slot (AS), which is a fraction of an accelerator is and managed by the AA 221.

An AA 221 may host multiple EIAs 223 and supports multi-tenancy (such that it allows attachments from different application instances 211 belonging to different users). Each accelerator slot can only be attached to one application instance at any given time.

The data plane 301 enables users to run Deep Learning inference applications using one or more remotely attached EIAs; monitor health and performance metrics of the inference applications running on the application instance 211; monitor health and performance metrics of the service components running on the accelerator appliance 221; ensure software components installed on the application instance 211 are up-to-date with the one installed on accelerator appliance 221; notify users about the health, connectivity and performance of the attached EIA; and/or ensure that a EIA delivers the promised performance (for example, in terms of TOPS and memory usage).

The data plane 301 includes at least one application instance 211 and at least one accelerator appliance 221. Each application instance 211 includes an application instance manger (AIM) 317 which runs on the application instance 211 that is responsible for vending the connection of the EIA to the application instance 211, checking connectivity with the EIA, ensuring that the software components installed on the application instance 211 are up-to-date with the one installed on the EIA, and pushing application instance 211 specific health information to the EIA.

The AIM 317 is launched at boot time and relaunched in case of crashes or unexpected shutdowns. When the control plane 351 attaches an accelerator 223, it injects into the instance metadata service (IMDS) 371 of the application instance 211 information on how to contact the accelerator 223 (details on this interaction are detailed in other parts of this specification). In some embodiments, the AIM 317 uses the IMDS 371 to check if an accelerator is attached. If no accelerator is attached to the AI 211, the IMDS 371 stays idle, waiting for the attachment of a new accelerator. If an accelerator is attached, the AIM 317 tries to connect to an accelerator slot manager (ASM) 329 in some embodiments. The communication happens through an endpoint served by the ASM 329 and initiated by AIM 317 in some embodiments. If the connection fails or if the connection is dropped in a later moment, after a few retries, the IMDS 371 reports the problem to the end-user. In some embodiments, the IMDS 371 is a http server that customers can use (for example, by curling a known endpoint from within their instance) to introspect certain data about their instance (e.g. in-stance-id, attached network interfaces, etc.).

If the connection is established, then the AIM 317 interacts with the ASM 329 to take inventory of the software that to be installed. The components on the AS are expected to be running an up-to-date software version or a compatible version with the components on the AI 211 at the end of this handshake procedure. In some embodiments, the up-to-date software version is loaded at this time such that the software is compatible with the model to be run. If the machine instance is locked and the components in the AI 211 are not compatible with the components in the accelerator, the connection is dropped and is reported in some embodiments.

The application 213 itself uses a client library 315 to make calls to the inference engine 325 of the accelerator 223. In some embodiments, the client library 315 uses gRPC for the remote procedure calls to the inference engine 325.

In some embodiments, the client library 315 implements an API. This API may include one or more of the following commands:

EIA.initLibrary(eiaID)—initialize a EIA context for the application which will be used in making calls to the EIA attached to the customer's application instance. An optional argument "eiaID" could be passed in case multiple EIA's are attached to the customer's application instance. Throws exception if the eiaID is invalid or there is no EIA attached.

eia.loadModel(name, model-config.xml, runtimeParameters)—load a model with the configuration given in "model-config.xml". The framework, version, location and other details related to the model could be passed using "model-config.xml". Runtime parameters such as max batch size could be provided using "modelParameters".

model.predict(inputTensor)—a synchronous inference API call to the "model" loaded onto the EIA. It returns the output tensor.

model.predictBatch(inputTensorArray)—a synchronous inference batch API call to the "model" loaded onto the EIA.

model.predictAsync(iTensor)—an asynchronous inference API call to the "model" loaded onto the EIA. It returns a future using which one can retrieve results.

outputFuture.getResults( )—return/block to retrieve the results of the inference call issued earlier.

model.predictBatchAsync(iTensorArray)—an asynchronous inference batch API call to the "model" loaded onto the EIA. It returns a future using which one can retrieve results.

oFuture.getResults( )—return/block to retrieve the results of the inference call issued earlier.

eia.listModels( )—list the models loaded onto the EIA "eia."

eia.unloadModel(name)—unload the model "name" which was loaded earlier. Exception is thrown if the model is not present.

eia.createTensor(shape, dtype)—create/allocate the tensor on EIA context with the specified shape and type.

eia.copyTensor(source, target)—copy the tensor from the "source" to the "target."

deleteTensor(inputTensor)—delete/de-allocate the tensor that was created earlier on the EIA context In some embodiments, a command line utility 319 may be used to access connectivity information and/or generate commands for inference, etc.

The AA 221 comprises several components including accelerator slot(s) 223, disk 333, and appliance management components 241. AA 221 components are responsible for bootstrapping, provisioning of isolated accelerator slots, monitoring events from the control plane 351 (such as attachment/recycling of accelerator slots), updating slots and appliance status (such as health and network connectivity) to the control plane 351, uploading metrics/logs.

The control plane 351 comprises a number of service components that perform the integration with the application instance 211 launch and termination and support for device query and management. As such, via the control plane Q51, users may launch an application instance 211 requesting that one on more accelerator slots 223 be attached as an elastic accelerator to the application instance 211, and terminate an application instance 211 that has an elastic inference accelerator attached to it.

In some embodiments, maintenance notifications for application instance 211 for when the accelerator appliance GQ21 backing the associated elastic inference accelerator becomes impaired or requires maintenance are routed through the control plane 351 to the user. Further, in some embodiments, the control plane 351 provides the metrics of the accelerator appliance 221 and application instance 211 to a user.

As noted above, accelerator slot 223 components run on every accelerator slot. All the components in an accelerator slot are isolated in terms of resources such as CPU, RAM, GPU compute, GPU memory, disk, and network. Accelerator slot components serve the attached customer instance for that accelerator slot 223.

An accelerator slot manager (ASM) 329 is responsible for the installation of the software components on the application instance 211. The ASM 329 listens a handshake, software synchronization, and health checks from the application instance 211. AIM 317 connects to the ASM 329 with the software inventory that is present in the application instance 211.

The ASM 329 is also responsible for receiving periodic health checks from the AIM 317. The ASM 329 reports the connectivity of the application instance 211 based on the receipt of the health check message from the AIM 317. This is written to disk by ASM 329 and read and reported to the control plane by the AAM through storage 361. The AIM 317 tracks the connectivity information. This could be retrieved by the customer on the application instance 211 using the utilities provided by the client library 315 or the command line utilities 319.

An inference engine (IE) 325 handles model loading and inference execution. As shown, this engine 325 is a separate process per accelerator slot 223. The IE 325 receives requests from the client library 315 on customer instance via a front-end receiver library. The IE 325 encompasses the run-times needed for the inference to work.

A model validator (MV) 327 checks user provided model file syntax for correctness and validity. In some embodiments, this is done in as a CPU process that is separate from the inference engine 223 so that there is no security-related leakage to the accelerator runtime. In some embodiments, the MV 327 converts the provided model to a different format (such as serializing MXNET to JSON). In some embodiments, the MV 327 selects the inference engine 325 to use when the application 213 (including library 315) has not made a selection.

In some embodiments, an application metrics collector 331 is a set of tools used to send, collect, and aggregate metrics for the application. In some embodiments, the application metrics collector 331 is StatsD. Metrics that are collected are stored to local disk 333 which is accessible by the appliance management components 241.

The appliance management components 241 include an accelerator appliance manager (AAM) 343, a storage uploader 345, and a metrics and log collector 347. The AAM 343 bootstraps the accelerator appliance 221 and provisions accelerator slots 221 via the monitoring of stored objects of storage 361, de-provisions/de-attaches accelerator slots once they are no longer needed, and recycles the accelerator slot for future use. It also monitors the accelerator slots 223 for their health and occupancy, and prepares an object to be uploaded to storage 361 by the storage uploader 345. Note that the monitoring and reporting of accelerators could be segregated and handled by another component.

The metrics and log collector 347 collects metrics and logs from the accelerator slots 223 and accelerator appliance 223 and massages the data appropriately for consumption by the control plane 351.

The storage uploader 345 uploads the health and occupancy reports (prepared by AAM 343), and metrics and log.

The inference applications using the client library 315 get the connection information of the accelerator appliance 221 by communicating with AIM 317.

The AIM 317 pushes to the ASM 329 heartbeats to notify the liveness of the AIM 317. This information is used by the ASM 329 report back to the control plane 351 about the health of the attached application instance 211.

The illustrated system minimizes the number of components between an application 213 using an accelerator running on the application instance 211 and the inference engine 325 running on the accelerator slot 223 to minimize latency and failure rate. Further, the control plane 351 of the inference service is decoupled from the data plane 301 (as shown) such that an outage in the control plane 351 should not impact application instances 211 or the accelerator slots 223 they are using.

The EI interface (the interface to the EIA) can be attached to an application instance during instance launch or dynamically attached/detached (to/from) a live instance. The EI interface can be accessed directly using the client library 315 or via model frameworks (such TensorFlow and MXNet frameworks). In a typical use case, an application instance 211 runs a larger machine learning pipeline, out of which only the accelerator appliance 221 bound calls will be sent using the EI interface API and the rest executed locally. Pre-processing of data input and post-processing of inferencing output is also done on the application instance 211. An example of an API command for launching an instance with an accelerator is as follows:
$ aws ec2 run-instances --region us-east-1 --eia-specification type=fp16.eia.medium --instance-type t2.medium --image-id ami-e3bb7399

The EI interface is sized by specifying arithmetic precision (such as FP32, FP16, INT8, etc.) and computational capacity (TOPS). An EI interface API allows for loading models, making inference calls against them (such as tensor in/tensor out), and unloading models. Multiple models can be loaded via an EI interface at any given time. A model consists of (i) a description of the whole computation graph for inference, and (ii) weights obtained from training. An example of an API command for loading is as follows:
$ eia load-model --model-location "s3 location"--role "eiaRole"--model_name "my_model_1"--max_batch_size 16

Models come in many different formats and embodiments of the service described herein support multiple formats. In some embodiments, model formats exported from TensorFlow and MXNet frameworks and model exchange formats like ONNX are supported. How a particular format is treated may vary. Typically, a model is loaded into an application instance and accelerator via one or more files and/or objects. For example, a model may be loaded into storage (such as storage 361) and then made available to the application instance and accelerator. These files and/or objects specify the model as a weighted computational graph such as in the format of TensorFlow, Apache MXNet, or ONNX. The model definition will use built-in operators/layers defined in the respective framework or interchange format. The model format version is specified in the model file and is the version number of the respective framework that was used to export the file (e.g., TensorFlow 1.5, MXNet 1.0, ONNX 1.0). In some embodiments, the accelerator runtime (such as model validator 327) will use this information to determine which inference engine 325 to use to serve the model.

During EI interface initialization, the trained model (computation graph) is provided as input and profiled, and, subsequently, the application 213 makes inferencing calls via the client library 315 on the application instance 211. There are many ways to implement this approach.

In some embodiments, ahead-of-time (AOT) compilation is used. For example, during the model loading on the EI interface, the trained model is compiled into target (hardware) code. This involves two sub-steps. First, a frontend compiler converts from the trained model file format to an intermediate representation while incorporating target-independent optimizations and analyses. Second, a backend compiler converts from the intermediate representation to machine code with target-dependent optimizations and analyses. This "AOT" compilation allows for whole program analysis. The target hardware is a combination of a CPU and accelerator device on the accelerator appliance 221 with the compilation is done on the accelerator appliance 221. The output incorporates an optimized execution plan for inference that is specific to the target architecture. The compile phase may need additional input like maximum batch size. Additionally, the representation can also be serialized to storage if needed, so that the compile phase can be avoided for future instantiations of inference for the same model and accelerator appliance 221 hardware. The runtime on the accelerator appliance 221 instantiates this as an "inference runtime object" in memory and uses it to execute future inferencing calls on the EI interface. The AOT compilation approach removes (most of the) machine learning (ML) engine dependency, hence the runtime has a low memory footprint and lower CPU overhead. In many cases, it may also lead to higher inferencing performance.

In some embodiments, a ML engine on the accelerator appliance 221 is utilized. The ML engine takes in the model as input and executes it during inferencing. Because the ML engine traverses the model graph and calls operator level API, this will have higher memory footprint and CPU overhead on the accelerator appliance 221.

In some embodiment, a ML engine on the application instance 211 is utilized. For some GPU-based acceleration, the CPU splits the computation between itself and the GPU and makes calls to the interface to offload computation to the GPU. This allows an ML engine to run on the customer instance and make calls over the network to the accelerator appliance 221 at the granularity of computation primitives. It is also possible to reduce latency of this approach by aggregating remote calls and sending them in a batch to the accelerator appliance 221. The client library 315 will be used to load the model on accelerator appliance 221 underneath the framework and subsequently to make inference calls to it.

In some embodiments, the advertised TOPS is attributable to the compute capacity of the acceleration hardware and not the CPU of that would run the application instance 211. Most compute-intensive operators have will be executed on the accelerator (for example, MXNet has a GPU implementation), but in control flow operators may not be expressible in serialized model format and will run on the CPU. Each accelerator slot on the accelerator appliance 221 also gets a share of the CPU of the application instance 211 and that share is proportional to provisioned TOPS.

In some embodiments, the syntax of the model is validated for correctness and conformity to the respective framework/version so that the customer cannot use this form as input to exploit vulnerabilities in the inference engines 223. The model validator verifies model syntax for each framework/format. This validation is done as a process that is separate from the inference engine 223 so that there is no security-related leakage to GPU runtime.

Figure 4:
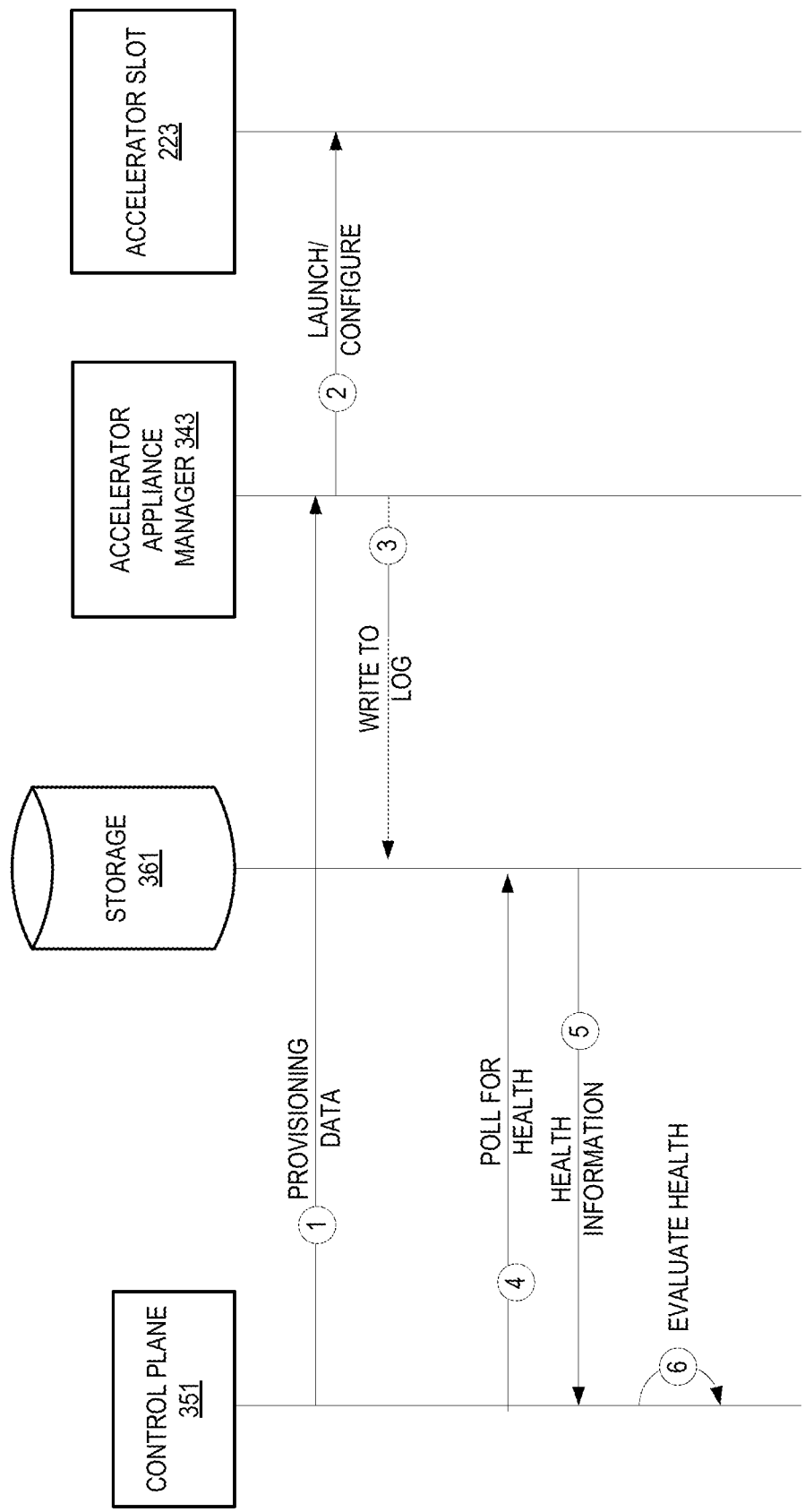
FIG. 4 illustrates examples of method of appliance provisioning as a swim lane diagram.

FIG. 4 illustrates examples of method of appliance provisioning as a swim lane diagram. This illustration focuses on the actions and communication between the control plane 351 and data plane components (such as accelerator appliance manager 343 and accelerator slot 223). As noted above, an appliance includes a controller (such as a CPU) and multiple accelerators (such as GPUs, ASICs, and FPGAs) coupled to the controller. The accelerator appliance manager 343 is responsible for provisioning and isolating the accelerator slot 223 which is a fraction of an accelerator, attaching/detaching application instances to accelerator slots, cleaning up and recycling the accelerators for future attachments, collecting and reporting the health and connectivity of the accelerators, and/or handling version upgrades of accelerator software. Storage 361 is used for object storage.

At circle 1, control plane 351 sends provisioning data to the accelerator appliance manager 343. This provisioning data includes one or more of an identifier of the accelerator appliance, one or more identifiers of accelerators to use, one or more identifiers of the accelerator types, an identifier or location of metadata storage, an identifier or location of log(s) (such as health logs and dumps) storage, and an encryption key (or location thereof). The accelerator appliance that is chosen matches the size and precision of the provisioning request of the user.

The accelerator appliance manager 343 performs a launch/configure of each accelerator slot 223 to use at circle 2. In some embodiments, this includes launching of a container, or virtual machine for the machine learning model. In some embodiments, bare metal is used.

The accelerator appliance manager 343 writes to the identified log storage 361 with log information at circle 3. For example, connectivity information to the health metric file (empty configuration may be written at this point. Examples of health metrics include, but are not limited to: an identity of the appliance, an identify of the instance, an identification of the appliance type, an indication of the health status (such as okay, impaired, stopped, etc.), and a time of the log. Note the connectivity information at this point in terms of the accelerator slot is typically empty as provisioning has just occurred.

Additionally, metrics information may be written. Exemplary metrics include, but are not limited to: datum for a metric such as a name, a unit, a value, statistical values (maximum value, minimum value, sample count, sum of values for a reference period), and a timestamp; and metric dimensions such as an instance identifier, an identifier of the accelerator slot, an identifier of the type of accelerator slot, an identifier of the software configuration for the instance; and an application instance identifier, etc.

Storing this information in storage 361 allows the control plane 351 to utilize the information. Each accelerator slot 223 produces a health and connectivity information and provides this to the accelerator appliance manager 343 at circle 4 which in turn updates the storage 361 at circle 5. In some embodiments, the health and connectivity information is produced each minute, however, in other embodiments this information is produced on demand, at a different rate, etc.

At some point the control plane 351 will poll for at least the health (such as polling for a health file) at circle 4. The storage 361 responds with the health information at circle 5 and the control plane 351 evaluates whether the provisioning was successful based on this health information. Provisioning may fail. For example, bootstrap issues such as failure to provision a slot may occur, or storage issues may occur such as a failure to write or write a health, metric, log, or dump information. For example, in some embodiments, if health information for an accelerator slot is never generated, the control plane 351 reprovisions the entire appliance. In some embodiments, when the data plane fails to put health information in storage 361, the control plane 351 waits until health information arrives (and times out at some point if one does not arrive) and a reprovisioning of the appliance occurs. Note that the control plane 351 may request (via the accelerator appliance manager 343), a resend of information if there is any data missing in storage 361.

Figure 5:
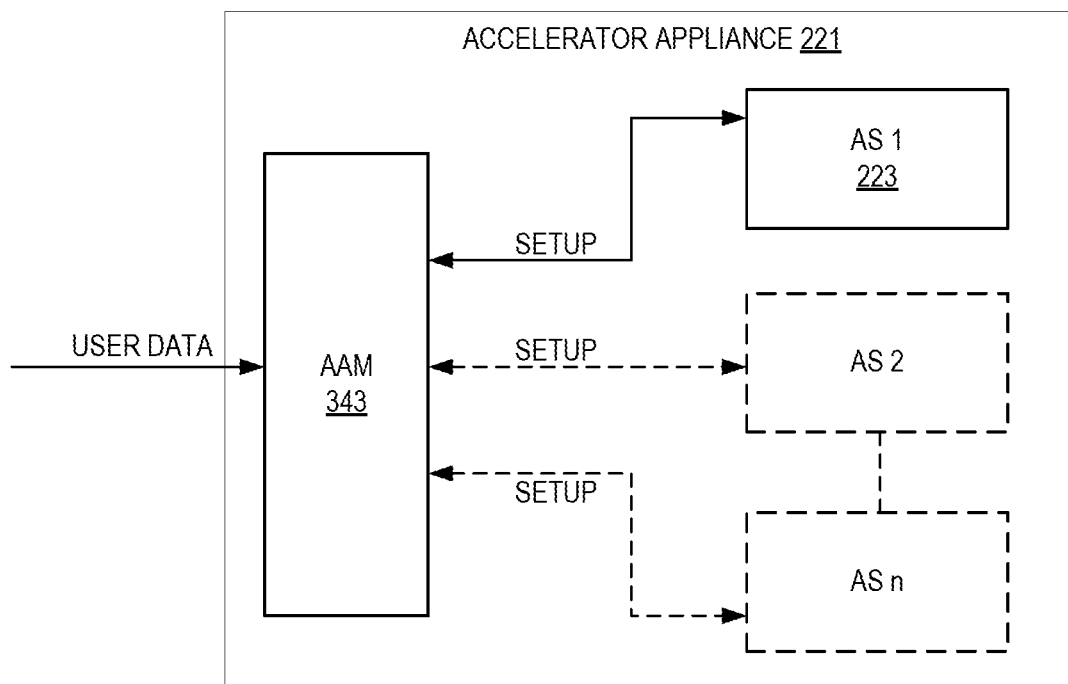
FIG. 5 illustrates an embodiment of accelerator appliance provisioning.

FIG. 5 illustrates an embodiment of accelerator appliance provisioning. As shown, the accelerator appliance 221 includes a plurality of accelerator slots (AS 1 325, AS 2, . . . , AS n). User provisioning data is received by the AAM 343 which then sets up each of the accelerator slots as needed. In this example, only AS 1 223 is setup. The AAM 343 does, however, track usage of the other accelerator slots. For example, AS 2 may be attached to a different application instance and the AAM 343 would know that and govern usage of the resources of the accelerator appliance 221 accordingly.

Figure 6:
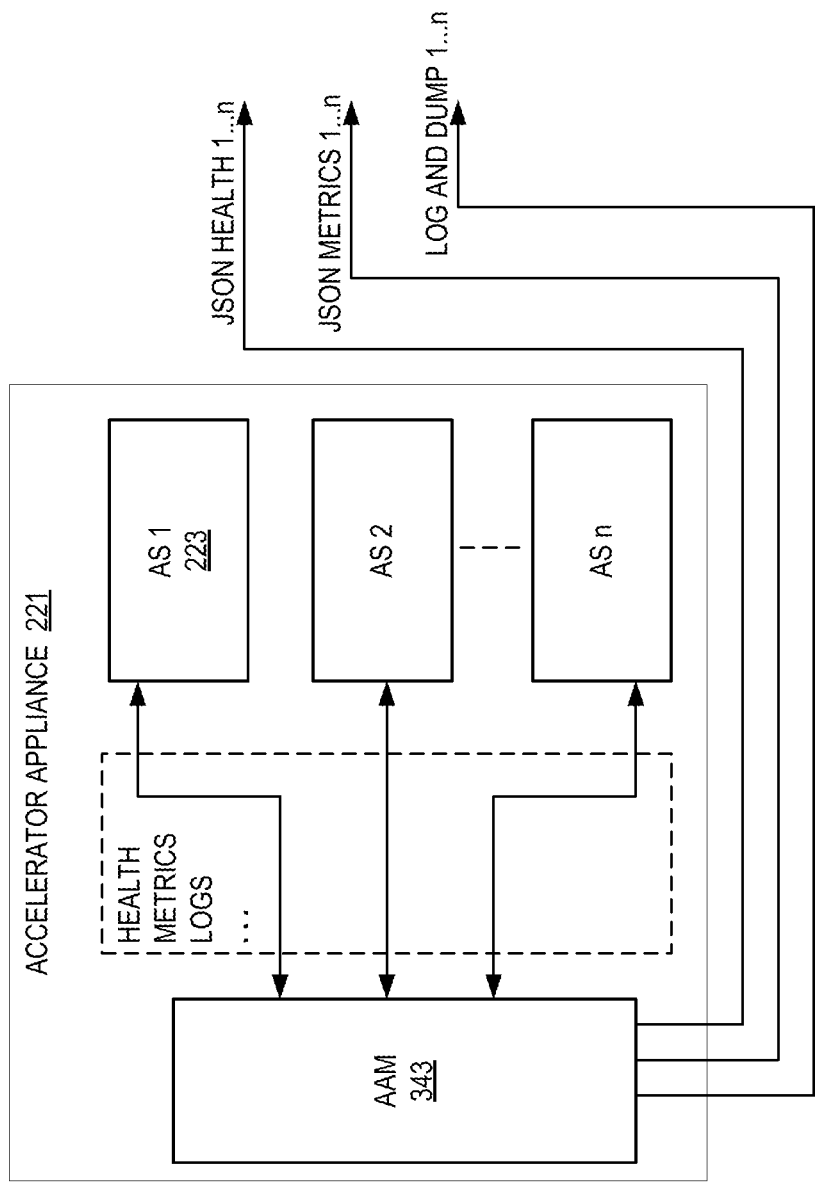
FIG. 6 illustrates an embodiment of accelerator appliance pre-attachment.

FIG. 6 illustrates an embodiment of accelerator appliance pre-attachment. As shown, the accelerator appliance 221 includes a plurality of accelerator slots (AS 1 223, AS 2, . . . , AS n). Each of the accelerator slots communicates with the AAM 343 (for example, through a local disk or directly) health, metric, and log information. The AAM 343 communicates the health and metrics information, per accelerator slot, in a JavaScript Object Notation (JSON) format to a storage location (such as storage 361) that is accessible to the control plane. Log and dump information, per accelerator slot, is also made available to the storage location that is accessible to the control plane. In some embodiments, the information is periodically sent out. The periodicity may be user defined or defined by the web services provider. In other embodiments, the information is sent out as it changes. For example, as health information changes (an accelerator slot becomes unhealthy).

Figure 7:
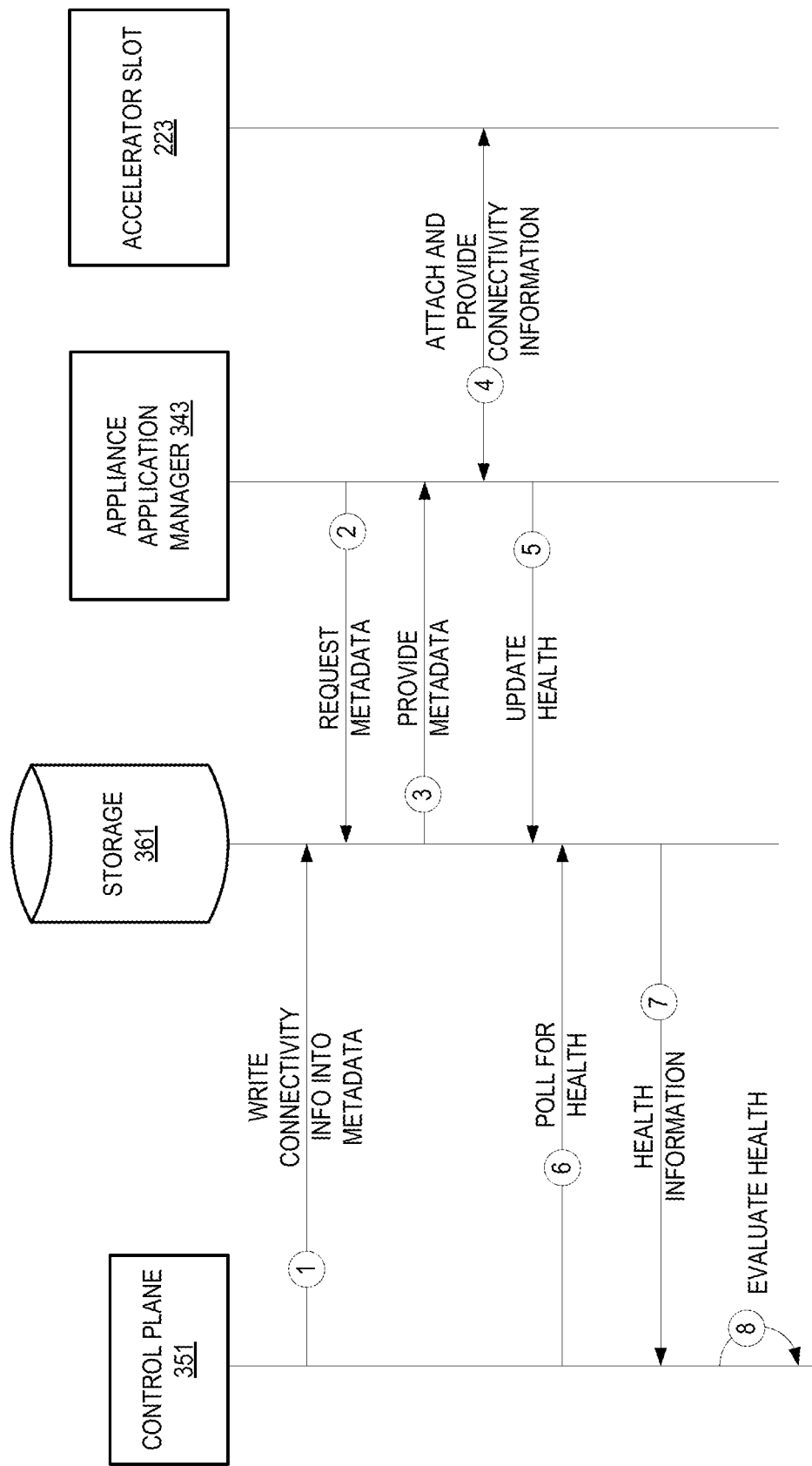
FIG. 7 illustrates examples of method of appliance attaching as a swim lane diagram.

FIG. 7 illustrates examples of method of appliance attaching as a swim lane diagram. This illustration focuses on the actions and communication between the control plane 351 and data plane components (accelerator appliance manager 343 and accelerator slot 223).

At circle 1, control plane 351 sends connectivity information to the accelerator appliance manager 343 via storage 361. This connectivity data includes one or more of: attachment metadata, health/connectivity data, and metrics data. In some embodiments, one or more of these are stored as separate files (such as an attachment metadata file, a health/connectivity file, etc.).

The attachment metadata may include, but is not limited to: attachment information such as a customer account identifier, an attachment identifier, an attachment type (the type of the accelerator slot 223), an application instance identifier, a domain identifier, a VLAN identifier of the network interface, a MAC of the network interface, and an IP address of the network interface.

The health/connectivity data may include, but is not limited to: health data such as an identity of the appliance, an identify of the instance, an identification of the appliance type, and an indication of the health status (such as okay, impaired, stopped, etc.), and a time of the log; and connectivity data such as connectivity status (connected/disconnected), an attachment identifier, an attachment type (the type of the accelerator slot 223), an application instance identifier, a domain identifier, and a timestamp.

Metrics data may include, but is not limited to: datum for a metric such as a name, a unit, a value, statistical values (maximum value, minimum value, sample count, sum of values for a reference period), and a timestamp; and metric dimensions such as an instance identifier, an identifier of the accelerator slot, an identifier of the type of accelerator slot, an identifier of the software configuration for the instance; an application instance identifier, etc.

The accelerator appliance manager 343 requests connectivity data information from the storage 361 at circle 2. The connectivity data information (if available), are provided at circle 3. The appliance application manager 343 then uses this information to attach one or more accelerator slots QA08 (for example, as detailed in attachment metadata) and the accelerator slot(s) 223 provides connectivity information back to the appliance application manager 343 at circle 4.

The accelerator appliance manager 343 writes to the identified log storage 361 with log information at circle 5. For example, connectivity information to the health metric information is written. Examples of health metrics where detailed above, however, they should not be empty at this point. Additionally, non-health metrics information may be written. Exemplary non-health metrics may include, but are not limited to: datum for a metric such as a name, a unit, a value, statistical values (maximum value, minimum value, sample count, sum of values for a reference period), and a timestamp; and metric dimensions such as an instance identifier, an identifier of the accelerator slot, an identifier of the type of accelerator slot, an identifier of the software configuration for the instance; an application instance identifier, etc.

At some point the control plane 351 will poll for at least the health information at circle 6. The storage 361 responds with the health information at circle 7 and the control plane 351 evaluates whether the attachment was successful based on this health information at circle 8.

Note that attachment may fail. For example, storage issues may occur such as a failure to write or read an attachment metadata information, or failure to write or read health, metric, log, or dump information. For example, in some embodiments, if the control plane 351 fails to send attachment metadata, the data plane will continue as it was previously acting. The control plane 351 will need to figure out what went wrong however. In some embodiments, when the data plane fails to read the attachment information, the accelerator slot 223 referenced by the attachment metadata will not know it is attached and the control plane 351 will consider the attachment impaired until the there is no longer any connectivity (as provided in the health data by the accelerator slot 223). In some embodiments, if the data plane fails to send a health information, or the control plane 351 fails to read the health information, the control plane 351 will consider the attachment impaired until the there is no longer any connectivity (as provided in the health data by the accelerator slot 223).

Figure 8:
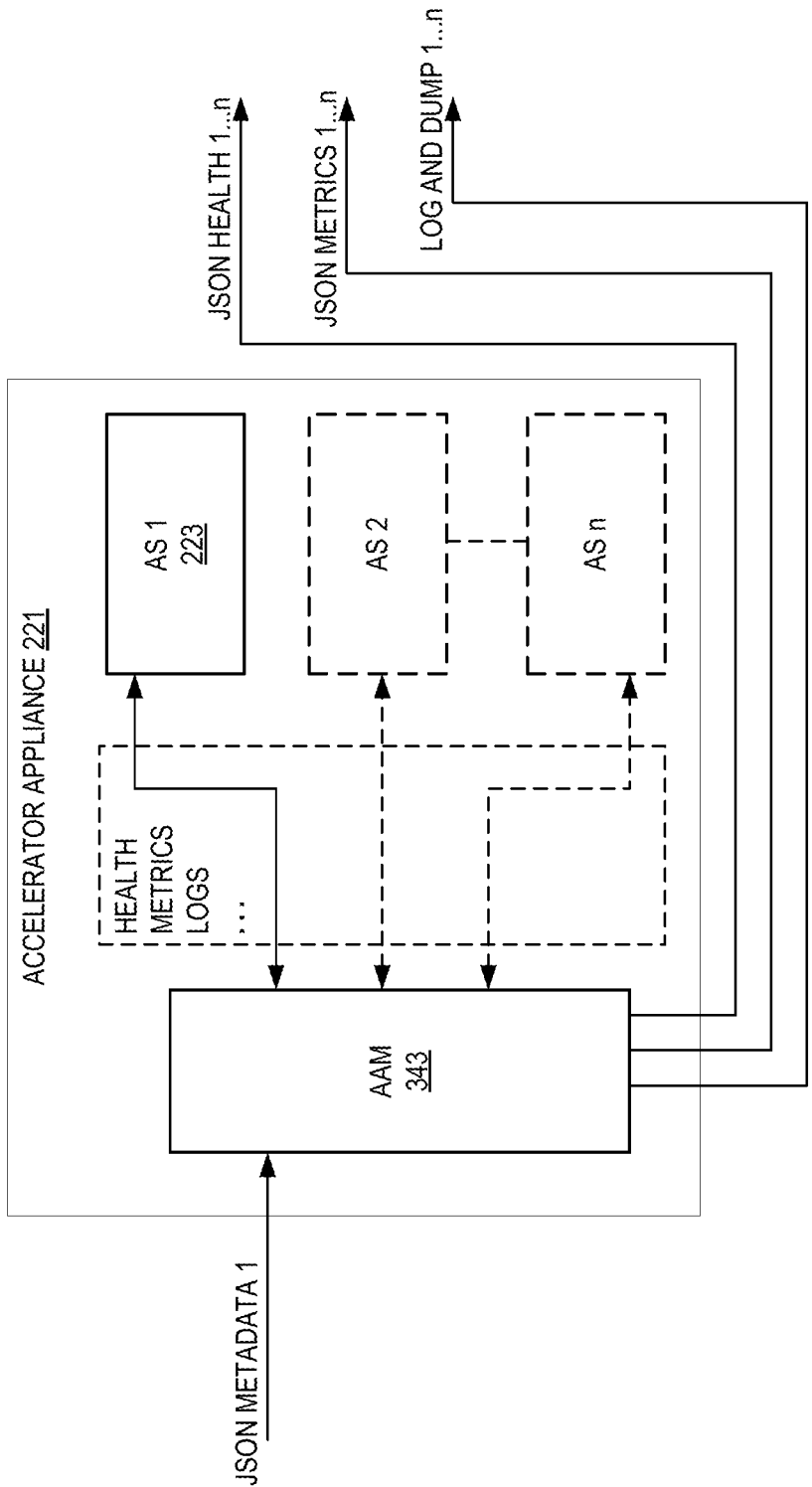
FIG. 8 illustrates an embodiment of accelerator appliance attachment.

FIG. 8 illustrates an embodiment of accelerator appliance attachment. In particular, one accelerator slot is attached. As shown, the accelerator appliance 221 includes a plurality of accelerator slots (AS 1 223, AS 2, . . . , AS n). An JSON metadata file is provided to AAM 343 indicating a user account has been attached to the application instance that is to use the accelerator appliance. The AAM 343 updates the health, metrics, and log and dump information and makes it available to the storage that is accessible to the control plane. As such, the control plane will know that the slot has been attached.

Figure 9:
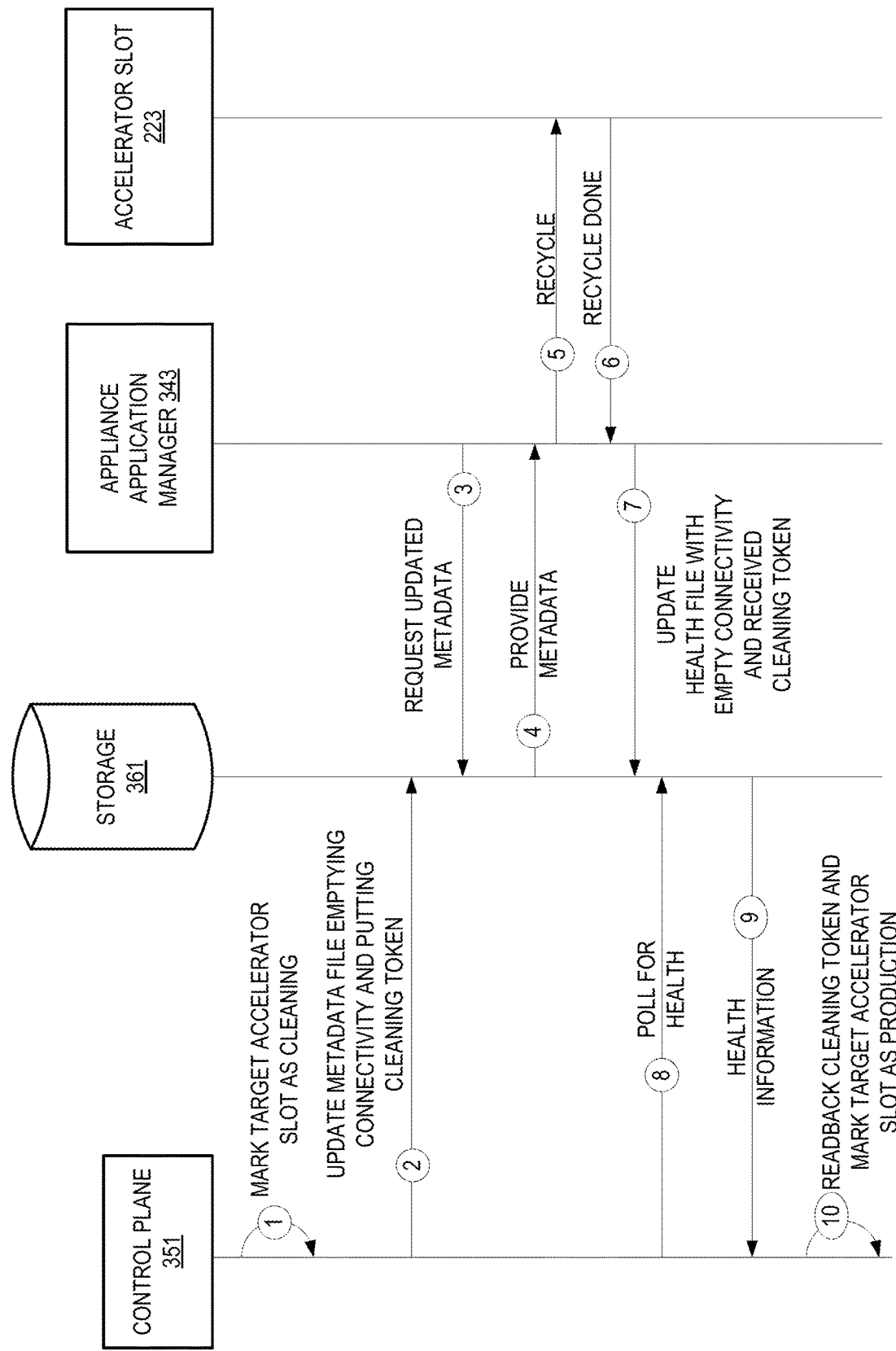
FIG. 9 illustrates examples of method of appliance de-attaching/recycling as a swim lane diagram.

FIG. 9 illustrates examples of method of appliance de-attaching/recycling as a swim lane diagram. This illustration focuses on the actions and communication between the control plane 351 and data plane components (accelerator appliance manager 343 and accelerator slot 223). At some point, an accelerator slot 223 will not be needed. The control plane 351 will inform that accelerator slot 223 of this. First, the control plane marks the targeted accelerator slot as in need of cleaning at circle 1.

The control plane 351 updates the metadata information of storage 361 at circle 2 to empty all connectivity information and putting in cleaning token that will be used by the accelerator slot 223 to confirm that the cleaning process has completed. For example, the attachment information will only have the cleaning token.

The accelerator appliance manager 343 requests one or more of the connectivity data from the storage 361 at circle 3. The connectivity data (if available), are provided at circle 4. The appliance application manager 343 then uses this information to de-attach one or more accelerator slots 223 (for example, as detailed in attachment metadata) and the accelerator slot(s) 223 provide connectivity information back to the appliance application manager 343 at circle 4.

The appliance application manager 343 informs the accelerator slot 223 to cleanup/recycle at circle 5. The accelerator slot 223 frees up resources being used by the application (such as addresses in memory, cache, etc.) and informs the appliance application manager 343 that the cleanup/recycling is complete at circle 6.

The accelerator appliance manager 343 writes to the storage 361 updated health information with the cleaning token included in addition to the normal health information for empty connectivity at circle 6.

At some point the control plane 351 will poll for at least the health information at circle 8. The storage 361 responds with the health information at circle 9 and the control plane 351 evaluates whether the de-attachment was successful based on this health information at circle 10. Note that de-attachment may fail. For example, storage issues may occur such as a failure to write or read update attachment metadata information, or failure to a read a cleaning token by the control plane 351. For example, in some embodiments, if the control plane 351 fails to send the updated attachment metadata, the data plane will continue as it was previously acting, but the control plane 351 will consider the attachment impaired since the customer instance was stopped. The control plane 351 will need to figure out what went wrong however. In some embodiments, when the data plane fails to read the updated metadata information, the accelerator slot 223 referenced by the attachment metadata will not know it is to be de-attached and the control plane 351 will consider the attachment to be in a cleaning state. No new placement to the accelerator slot 223 will occur until the cleaning state has been lifted.

Figure 10:
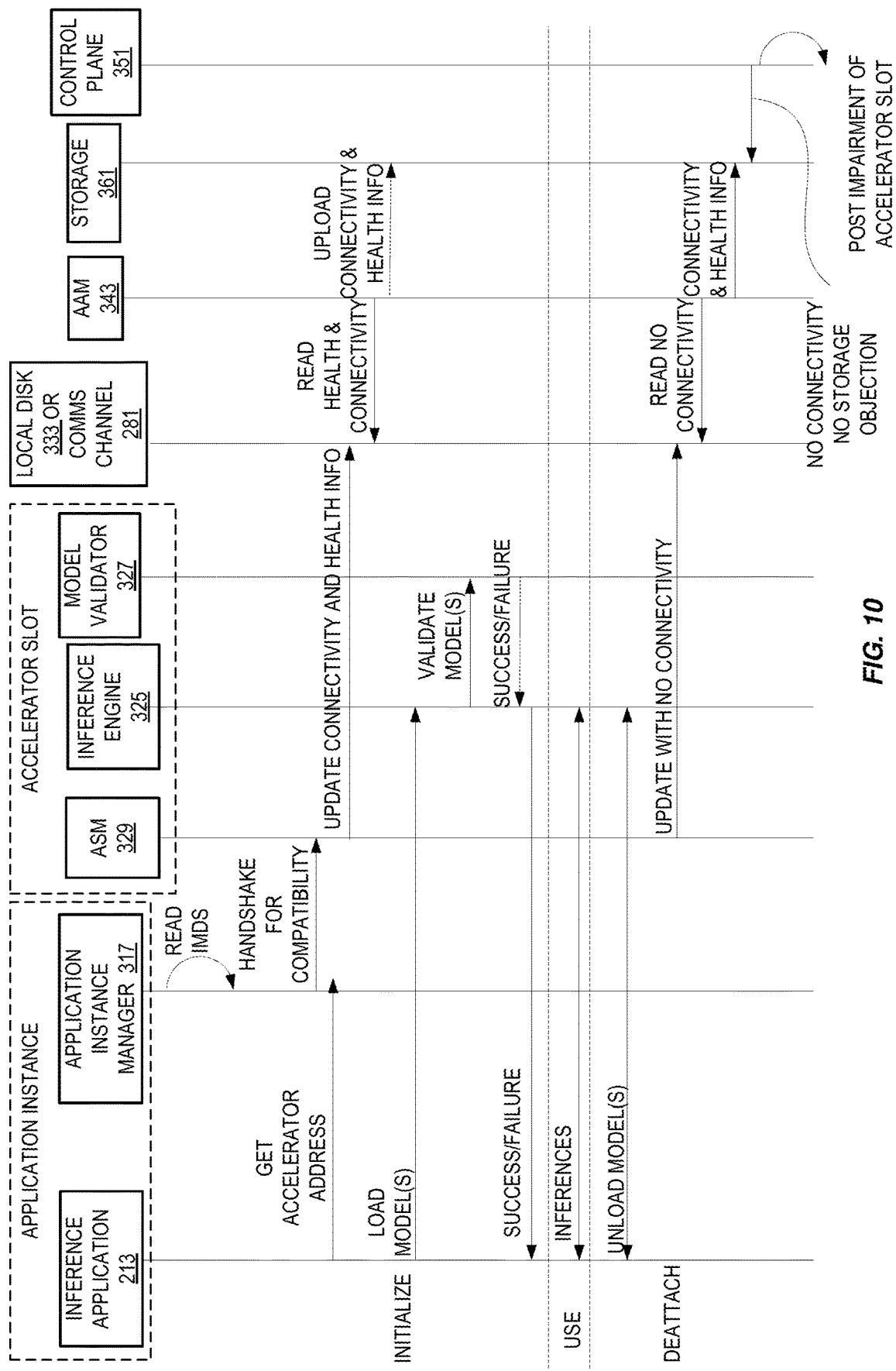
FIG. 10 illustrates embodiments of a swim diagram of a method of using an accelerator for elastic inference including interactions between application instance and an accelerator appliance.

FIG. 10 illustrates embodiments of a swim diagram of a method of using an accelerator for elastic inference including interactions between application instance and an accelerator appliance.

As shown, the AIM 317 reads the IMDS to get information on how to contact the accelerator 222. In some embodiments, the IMDS information includes information on how to contact a particular accelerator slot 223.

The AIM 317 and ASM 329 of the accelerator slot 223 perform a handshake operation to determine compatibility. If compatible, the inference application 213 of the application instance 211 acquires the address of the accelerator from the AIM 317. As such, the inference application 213 now knows where to address scoring data it is to process.

The ASM 329 of the accelerator slot to be used by the application instance updates its connectivity and health information in a local disk 333 of the accelerator appliance or using a communication channel 281. The AAM 343 reads this information and places it into storage 361 accessible by the control plane. As such, the application instance and accelerator slot have learned how to connect to each other, and the accelerator appliance has made that information available to the control plane 351. How the control plane interacts with that data is detailed elsewhere.

The inference application 213 also loads one or more models that it wants to use to the accelerator slot. In some embodiments, this load is to an inference engine 325 which then calls the model validator 327 to validate any uploaded model(s). The success or failure of that validation is provided to the inference engine. In other embodiments, the load from the inference engine 212 is to the model validator 327 which validates the model, chooses an inference engine 325 to utilize, and provides the validated model to the chosen inference engine 325. An indication of successful model loading is provided to the inference application 213.

As scoring data is received by the inference application 213 is directed to the inference engine 325 and the result(s) are passed back.

When the model is not longer to be used, it is unloaded via a command from the inference application 213 to the accelerator slot. In particular, the inference engine 325 is no longer provisioned to handle requests from the inference application 213.

Note, as discussed elsewhere, the accelerator slot (ASM 329 in particular) updates the local disk 333 with connectivity information which the AAM 343 provides to storage 361 for consumption, or sends over a communication channel 281. When the control plane 351 determines there is no connectivity (such as after unload of the model or failure) via the storage 361, it makes the slot as being impaired.

Additionally, failures when using one or more accelerator slots can happen because of connectivity issues, component failures, component incompatibilities, etc. Detecting the failure, identifying the root cause, and notifying the user to take necessary and corrective action are functions the elastic inference service 105 provides in some embodiments. As noted above, an accelerator slot emits metrics regarding connection health and slot health which are then uploaded by the AAM 343 to storage 361 for consumption by the control plane 351. Connection health could be in one of these states: connected and not connected. Connected indicates that the application instance 211 is able to reach the accelerator slot 223 via "application level ping" and the application instance 211 components are compatible with the components on the accelerator slot 223. Not connected could mean either the application instance 211 couldn't reach the ASM 329 or the components are incompatible.

Accelerator health identifies whether the accelerator is healthy. Accelerator health could be in one of these many states including, but not limited to: healthy or unhealthy. The healthiness of the accelerator slot 223 depends on a variety of factors including whether the inference engine 325 is able to respond to inference requests. This check is done by ASM 329 by pinging the inference engine 325.

ASM 329 emits these states per accelerator to a local disk 333 which this then read by the AAM 343 and forwarded states to the control plane 351. The control plane 351 consolidates these states to one state for which reflects the state of the attachment as: OK, Impaired and Unknown and made available to the user.

Figure 11:
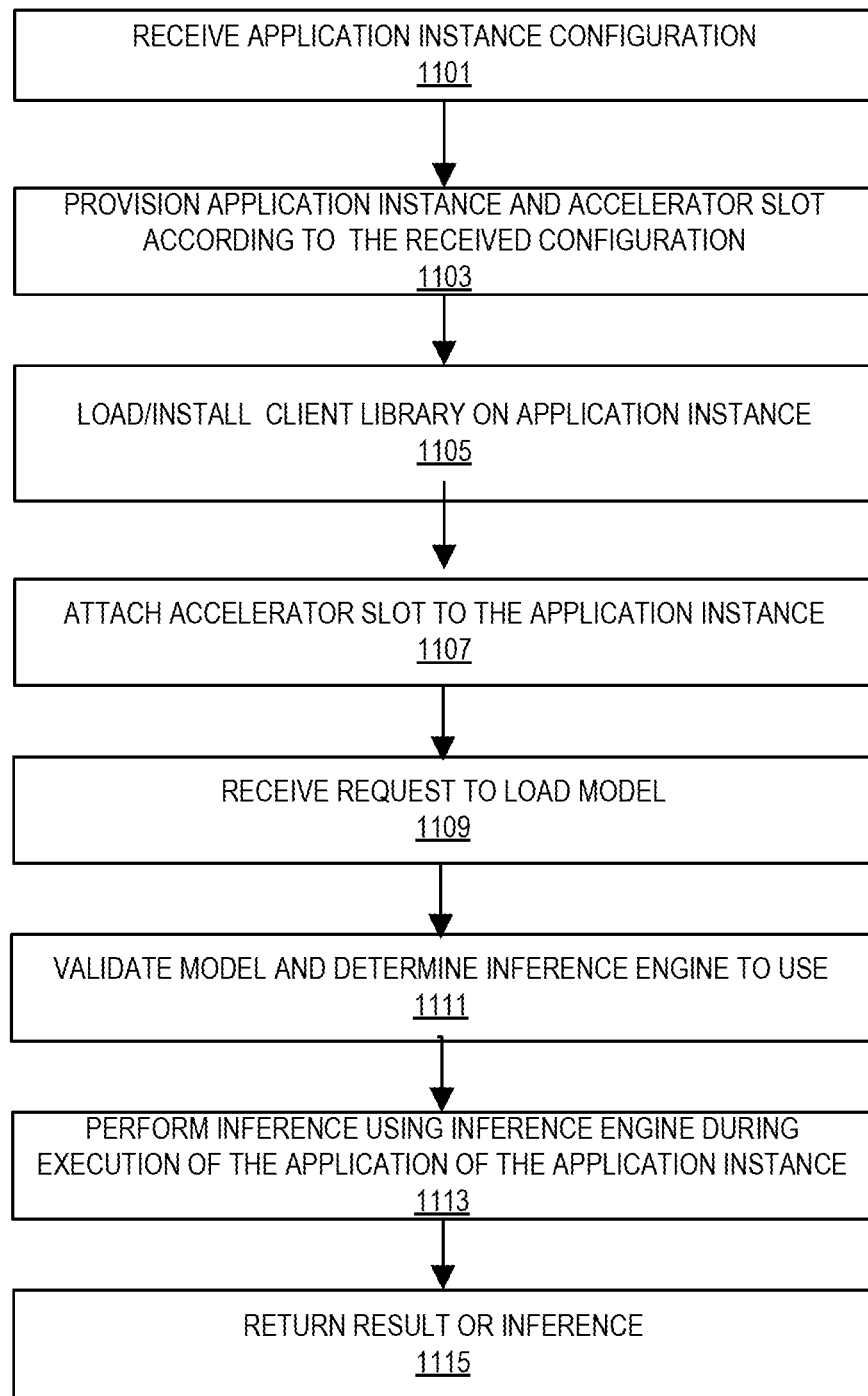
FIG. 11 illustrates embodiments of a method performed by a web services provider in implementing an elastic inference service.

FIG. 11 illustrates embodiments of a method performed by a web services provider in implementing an elastic inference service. At 1101, a front end of the web services provider receives application instance configuration information that is to be used by the elastic inference service. For example, the front end 103 receives configuration information and provides it to at least the elastic inference service 105. Configuration information may include, but is not limited to, one or more of: an indication of a machine image, an indication of an instance type for the application instance, virtual network information to be utilized by the application instance, an indication of an accelerator type to use for inference, and an indication of one or more storage locations to be used (such as a location of the application, a location that results of the inference are to be located, a location of health and connectivity information, auto-scaling usage, etc.).

In some embodiments, the application instance and/or the accelerator appliance are a subjected to auto-scaling by the elastic inference service 105 (as opposed to scaling manually). Auto-scaling attempts to distribute instances evenly by launching new instances of the application and/or the accelerator slot(s) on devices with the fewest instances. When rebalancing (such as after an accelerator slot becomes unhealthy), auto-scaling launches new instances before terminating the old ones, so that rebalancing does not compromise the performance or availability of the application. Typically, the configuration information includes an indication of whether auto-scaling should be applied by the elastic inference service 105.

An application instance is provisioned along with at least one accelerator slot according to the received configuration at 1103. An example of provisioning an accelerator slot is described by FIG. 4 and associated text.

In some embodiments, the elastic inference service includes a location selection functionality that performs location optimization for resources in the web services provider. Using the location selection functionality, a particular one of the accelerator locations may be selected for a physical accelerator that implements an accelerator slot. The accelerator slot location may be selected based (at least in part) on one or more placement criteria. Using the location selection functionality, a particular one of the accelerator slot locations may be selected for a physical compute instance that implements a virtual compute instance (such as on the same physical machine). The application instance location may also be selected based (at least in part) on one or more placement criteria.

The placement criteria used to select the accelerator slot location may be the same criteria or different criteria as the placement criteria used to select the application instance location. In one embodiment, both the application instance location and the GPU location may be optimized for a particular virtual compute instance and its attached virtual GPU. In one embodiment, the placement criteria used to optimize the placement of a particular virtual application instance and/or accelerator slot is provided or approved by a client of the provider network. In one embodiment, the placement criteria used to optimize the placement of a particular application instance and/or accelerator slot may be provided or approved by an administrator of the provider network. In one embodiment, the placement criteria used to optimize the placement of a particular application instance and/or accelerator slot may be determined using a default configuration.

The one or more placement criteria may include or be associated with optimization (e.g., improvement) of metrics for performance (e.g., to maximize performance), resource usage (e.g., to minimize resource usage), cost (e.g., to minimize cost or fit resource costs within a client-specified budget), energy usage (e.g., to minimize energy usage or prioritize "green" energy), network locality (e.g., to minimize networking proximity between two or more resources), and/or any other suitable metrics. Performance metrics and cost metrics used as placement criteria may often be associated with the use of the physical accelerator by the physical compute instance. Performance metrics may include network-related metrics such as latency and bandwidth, as measured within the provider network and/or between the provider network and a client device. Performance metrics may include any other metrics related to processor use, GPU use, memory use, storage use, and so on. As an example, to minimize network latency and/or bandwidth, an application instance location for a physical compute instance may be selected within the same rack as the physical accelerator such that network communication between the underlying physical compute instance and physical accelerator may not extend beyond a top-of-rack switch in the rack. If locations within the same rack are not available, then an instance location nearby the physical accelerator (e.g., within the same data center) may be selected to optimize the placement criteria. As another example, an accelerator location in a data center nearest the client device may be selected to minimize latency between the physical accelerator and the client device, where the proximity of the data center to the client device is measured based on anticipated or historical latency and/or on geographical proximity.

As used herein, provisioning generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. The virtual compute instance may be selected from a plurality of instance types having various capabilities.

Placement optimization for network locality may attempt to group multiple resources (e.g., one or more physical compute instances and one or more physical accelerators) based (at least in part) on proximity within a network. Network locality may refer to one or more locations, connections, associations, or zones in a network to which a resource belongs. A resource itself may be a node or particular network location (e.g., network address) and thus a network locality. Network locality may be determined based on the network router, switch, or other network device or infrastructure (e.g., network spine) to which a resource is connected. Network localities may be logically determined according to logically associated network devices or resource in some embodiments. A resource may belong to multiple network localities, such as being connected to a particular network router, which may be in turn linked to other network routers, or networking devices. Application instance locations and/or accelerator locations may be selected based (at least in part) on network locality.

At 1105, a client library is loaded onto the provisioned application instance. In some embodiments, an instance manager is also loaded/installed. The functionality of these components has been detailed elsewhere.

An accelerator slot is attached to the application instance at 1107. FIG. QD illustrates embodiments of accelerator slot attachment.

The request to load a model in the accelerator slot is received at 1109. For example, the ASM 329 receives this request. Typically, this request to load a model includes a location of the model. Note, this request may be from a user, or come from the provisioned application instance.

The model to be loaded is validated, an inference engine to use is determined, and the model is loaded at 1111. Examples of model validation and inference engine selection have been detailed earlier.

Inferences are performed using the loaded model during execution of the application at 1113 and results are returned as dictated by the application of the application instance at 1115. Note the accelerator appliance is managed including resource governed during the above.

Figure 12:
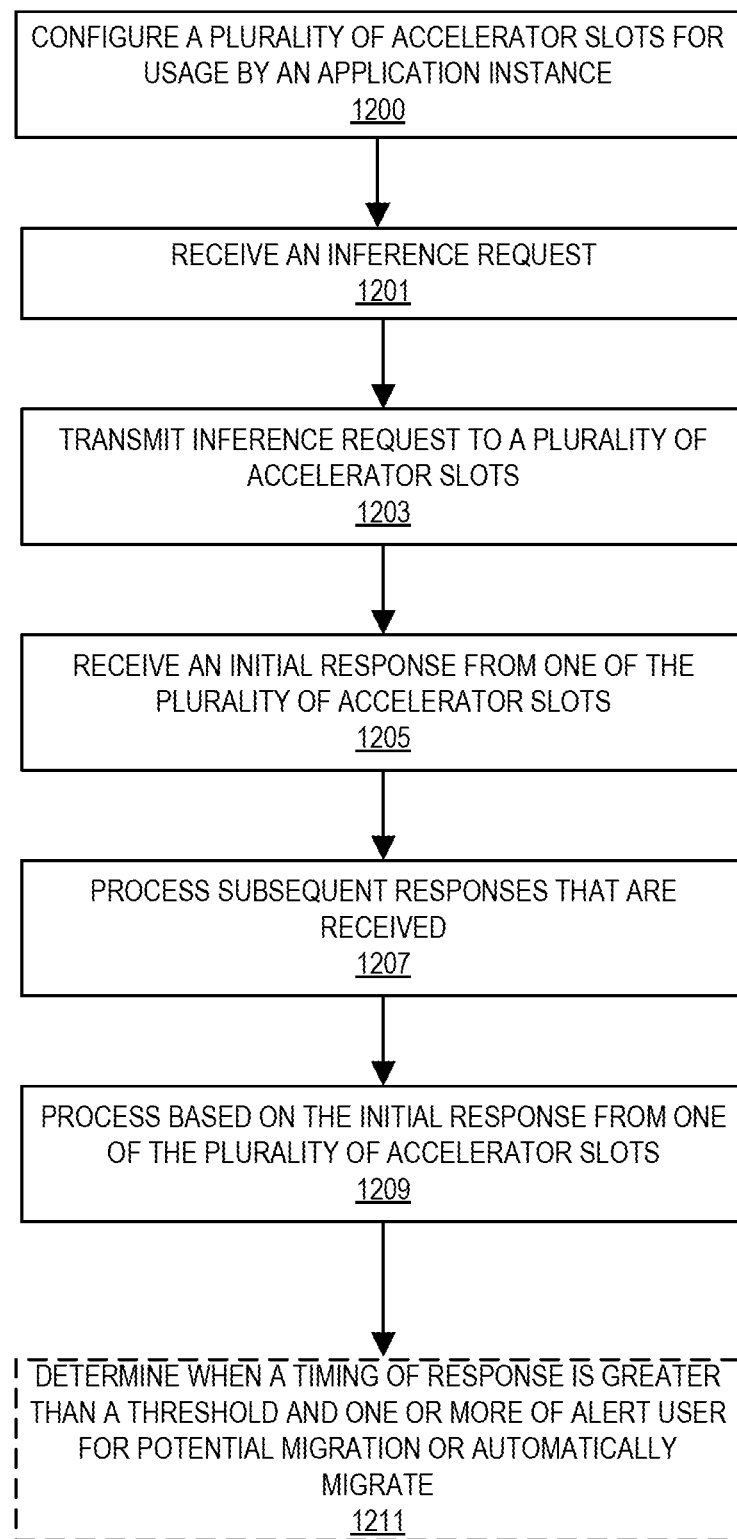
FIG. 12 illustrates embodiments of a method performed by a web services provider in implementing an elastic inference service.

FIG. 12 illustrates embodiments of a method performed by a web services provider in implementing an elastic inference service. In particular, embodiments of the method describe handling of inference requests.

At 1200, a plurality of accelerator slots are configured for use by an application instance. The configuration includes provisioning, attaching, selecting, model loading, etc. as detailed elsewhere such as FIG. 11, for example. Note that each of the accelerator slots is separately addressable and an application may call different accelerator slots to perform different actions.

At 1201, an inference request is received by an application instance. For example, the front end 103 receives scoring data and provides this data an application instance 211.

The inference request data (scoring data) is forwarded to the coupled inference engines of a plurality of accelerators attached to the application instance at 1203. For example, the client library 315 is called to forward this data from an application 213 to a plurality of inference engines 325.

An initial response is received from one of the plurality of accelerator slots by the application at 1205. This response is considered to be the result to use. As subsequent responses are received they are processed at 1207. In some embodiments, the processing includes throwing out one or more of the subsequent responses. In some embodiments, subsequent responses are merged. The application uses the initial response at 1209.

In some embodiments, the timing of responses is tracked. For example, as each of the responses is received how long the response took is calculated. The tracking of timing allows for an application (or application user) to determine if an accelerator slot should be deattached and a different one attached. At 1211, a determination of if timing of one or more responses is greater than a threshold is made and one or more of the user is alerted for potential migration and/or an actual migration to a different accelerator slot is made. As such, as an accelerator appliance 221, or network(s) coupling the accelerator appliance 221 and application instance 211, experiences slowdowns, the application and/or user is able to adjust. Note the accelerator appliance is managed including resource governed during the above.

Figure 13:
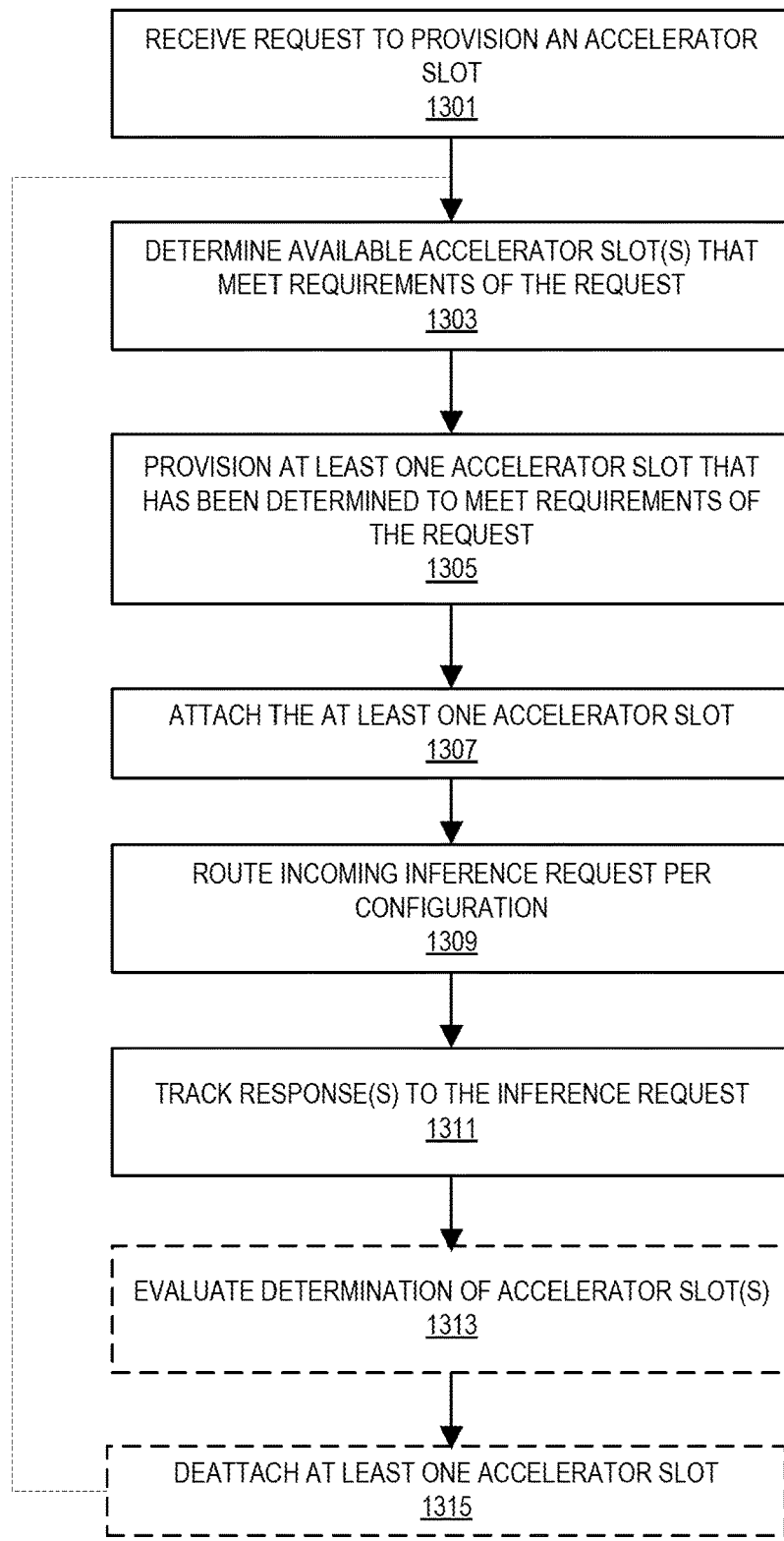
FIG. 13 illustrates embodiments of a method performed by a web services provider in implementing an elastic inference service.

The deattachment and new attachment is a form of migration. As such, there is a replacement of one or more accelerator slots with one or more accelerator slots for the application instance, a migration of processing for the application instance from the first set of one or more accelerator slots to the second set of one or more accelerator slots, and execution of the application of the application instance using the second set of one or more accelerator slots. In some embodiments, the new one or more accelerator slots provide a different level of processing relative to the first set of one or more accelerator slots. In some embodiments, replacing the first set of one or more accelerator slots with the second set of one or more accelerator slots comprises causing the second set of one more accelerator slots to assume operation in place of the first set of one more accelerator slots FIG. 13 illustrates embodiments of a method performed by a web services provider in implementing an elastic inference service. In particular, embodiments of the method describe handling of a provisioning of an accelerator slot.

At 1301, a request is received by provision and attach an accelerator slot for a model. The request may include one more of a data type to be used, the model itself (or a location thereof), timing requirements, cost requirements, etc.

The available accelerator slots that meet the requirements of the request are determined at 1303. For example, the data types of the model are evaluated and accelerator slots that cannot handle those types are deemed to not meet the requirements. In some embodiments, this determination includes executing the model to determine what accelerator slots will work and meet the requirements. In other embodiments, the model is compared to other models that have been run by the elastic inference service and the previous execution of similar models informs the determination. Additionally, the location of the accelerator slot may be optimized as detailed elsewhere.

At least one or more accelerator slots that have been determined to meet the requirements of the request are provisioned at 1305. The provisioned one or more accelerator slots are attached to the application instance at 1307. Provisioning and attaching have been detailed earlier.

Incoming inference request data (scoring data) is forwarded to the coupled inference engine(s) of the at least one or more accelerators slots attached to the application instance at 1309. For example, the client library 315 is called to forward this data from an application 213 to a plurality of inference engines 325.

The response(s) is/are tracked at 1311. For example, as each of the responses is received how long the response took is calculated and/or any errors thrown by the accelerator slot(s).

An evaluation of the accelerator slots that met the requirements of the model and application is made at 1313 in some embodiments. For example, are the responses timely, is the result correct, is the accelerator slot healthy, etc.?

In some embodiments, at 1315, one or more of the attached accelerator slots are deattached at 1315 if they no longer meet the requirements.

In some embodiments, another determination of available accelerator slots that meet the requirements of the request are determined if the slot(s) are not meeting the requirements. This allows for scaling. Note that de-attachment may not always occur and. in some embodiments, more slots are allocated to scale.

Note the accelerator appliance is managed including resource governed during the above.

Figure 14:
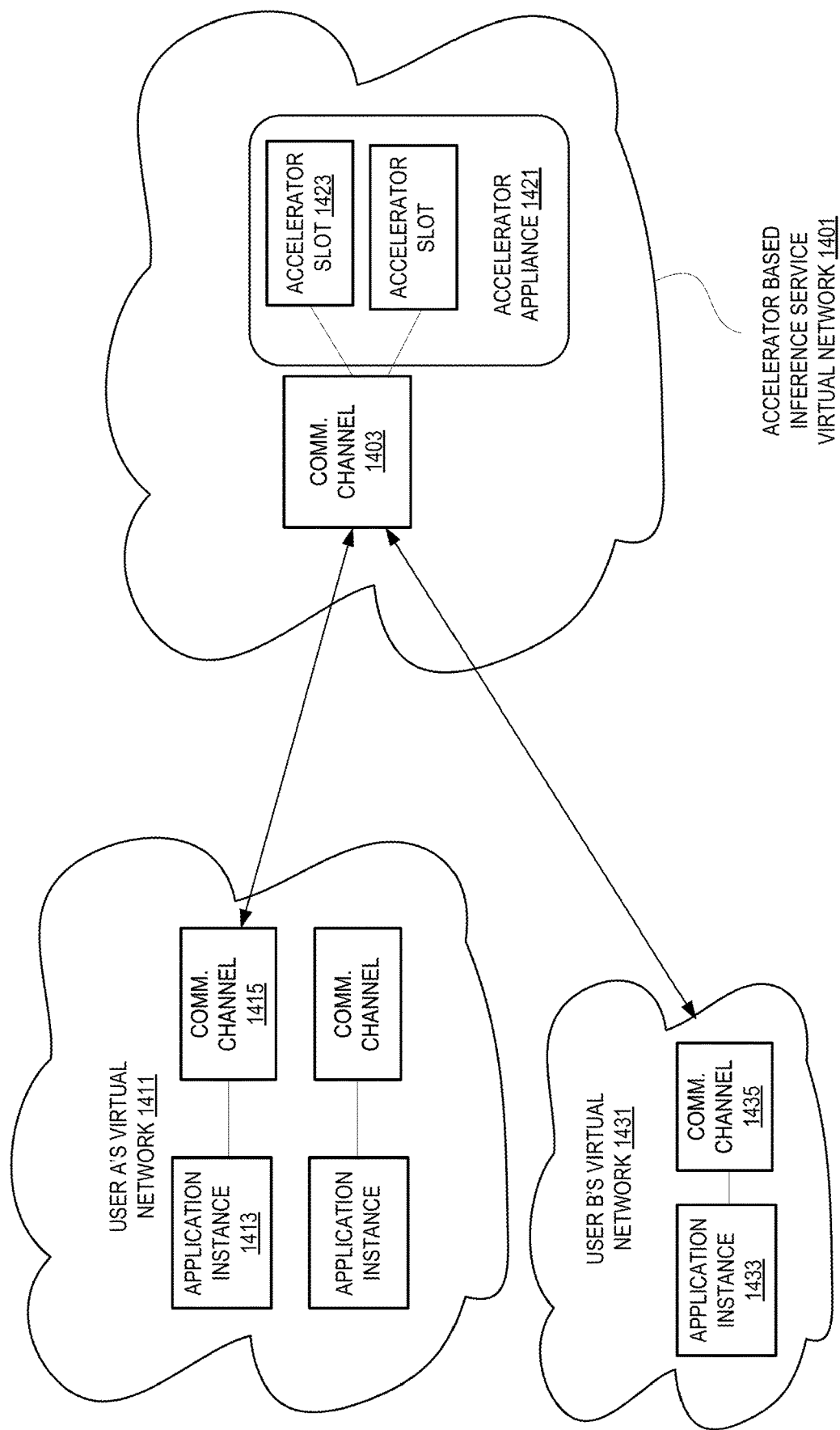
FIG. 14 illustrates embodiments of a systems using an accelerator-based inference service.

FIG. 14 illustrates embodiments of a systems using an accelerator-based inference service. This illustration highlights networking aspects of such systems. The accelerator-based inference service virtual network 1401 includes one more accelerator appliances 1421. As detailed, each accelerator appliance has one or more accelerator slots 1423 that are coupled to a "trunking" communication channel 1403 of the accelerator-based inference service communication channel (such as a network) 1401. The trunk communication channel 1403 knows the location identifier of each accelerator slot 1423 of the accelerator appliance 1421.

As shown, users have different virtual networks (user A's virtual network 1411 and user B's virtual network 1431). Within each virtual network is at least one network interface (such as communication channel 1415 and communication channel 1435) and at least one application instance (such as application instance 1413 and application instance 1433). An application instance communicates with an accelerator slot via its network interface in the user's virtual network.

In some embodiments, a network namespace is utilized to isolate network interfaces among accelerator slots on the same physical accelerator appliance such that each accelerator slot's network interface resides in its own namespace. Moving an accelerator slot's network interface to its own namespace allows for different virtual networks to have overlapping IP addresses.

Figure 15:
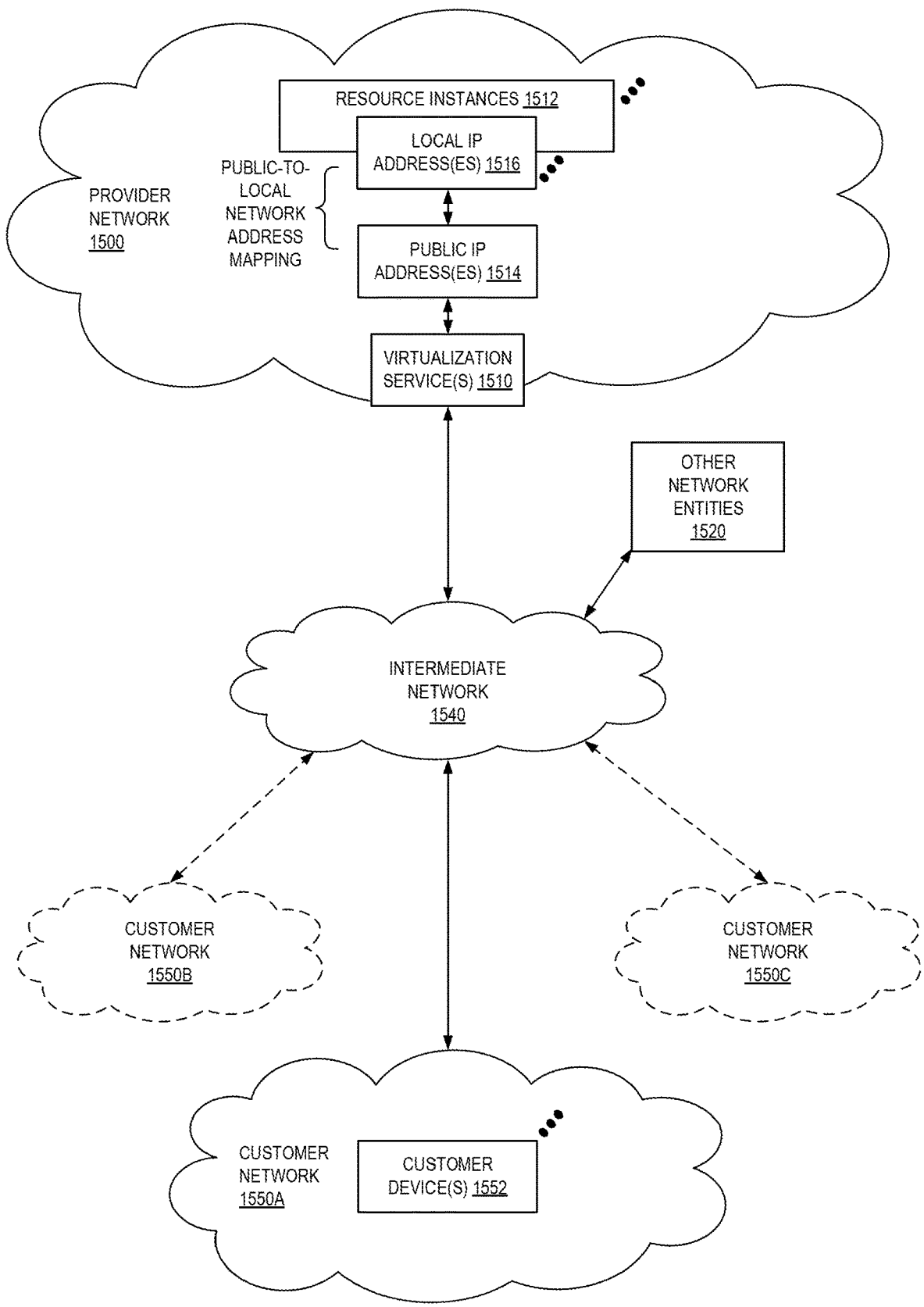
FIG. 15 illustrates an example provider network environment according to some embodiments.

FIG. 15 illustrates an example provider network (or "service provider system") environment according to some embodiments. A provider network 1500 may provide resource virtualization to customers via one or more virtualization services 1510 that allow customers to purchase, rent, or otherwise obtain instances 1512 of virtualized resources, including but not limited to computation and storage resources, implemented on devices within the provider network or networks in one or more data centers. Local Internet Protocol (IP) addresses 1516 may be associated with the resource instances 1512; the local IP addresses are the internal network addresses of the resource instances 1512 on the provider network 1500. In some embodiments, the provider network 1500 may also provide public IP addresses 1514 and/or public IP address ranges (e.g., Internet Protocol version 4 (IPv4) or Internet Protocol version 6 (IPv6) addresses) that customers may obtain from the provider 1500.

Conventionally, the provider network 1500, via the virtualization services 1510, may allow a customer of the service provider (e.g., a customer that operates one or more client networks 1550A-1550C including one or more customer device(s) 1552) to dynamically associate at least some public IP addresses 1514 assigned or allocated to the customer with particular resource instances 1512 assigned to the customer. The provider network 1500 may also allow the customer to remap a public IP address 1514, previously mapped to one virtualized computing resource instance 1512 allocated to the customer, to another virtualized computing resource instance 1512 that is also allocated to the customer. Using the virtualized computing resource instances 1512 and public IP addresses 1514 provided by the service provider, a customer of the service provider such as the operator of customer network(s) 1550A-1550C may, for example, implement customer-specific applications and present the customer's applications on an intermediate network 1540, such as the Internet. Other network entities 1520 on the intermediate network 1540 may then generate traffic to a destination public IP address 1514 published by the customer network(s) 1550A-1550C; the traffic is routed to the service provider data center, and at the data center is routed, via a network substrate, to the local IP address 1516 of the virtualized computing resource instance 1512 currently mapped to the destination public IP address 1514. Similarly, response traffic from the virtualized computing resource instance 1512 may be routed via the network substrate back onto the intermediate network 1540 to the source entity 1520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1500; a customer may then assign their allocated public IP addresses to particular resource instances allocated to the customer. These public IP addresses may be referred to as customer public IP addresses, or simply customer IP addresses. Instead of being assigned by the provider network 1500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 16:
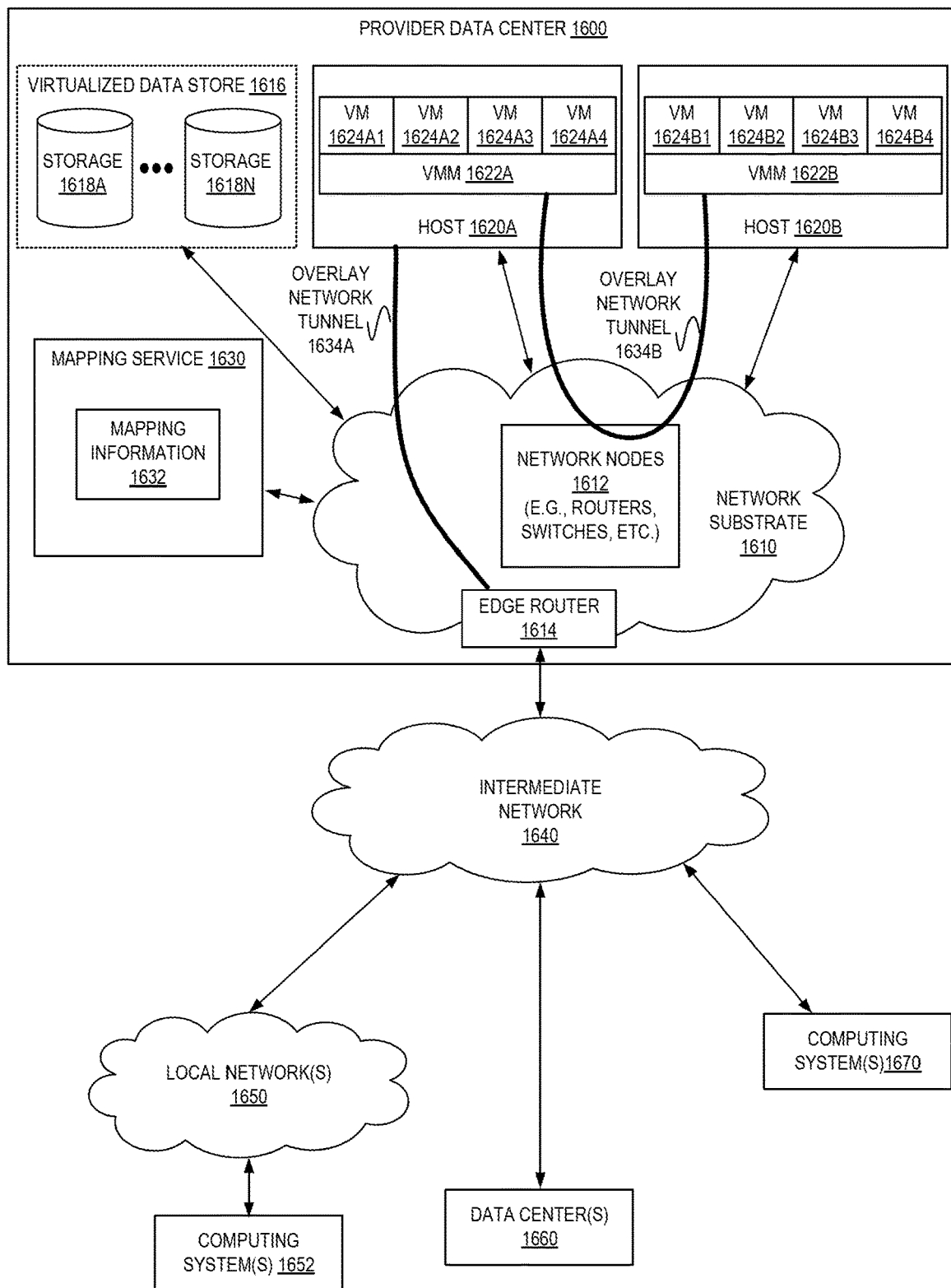
FIG. 16 illustrates an example data center that implements an overlay network on a network substrate using IP tunneling technology according to some embodiments.

FIG. 16 illustrates an example data center that implements an overlay network on a network substrate using IP tunneling technology, according to some embodiments. A provider data center 1600 may include a network substrate that includes networking nodes 1612 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1610 using tunnels. The IP tunneling technology may provide a mapping and encapsulating system for creating an overlay network on a network (e.g., a local network in data center 1600 of FIG. 16) and may provide a separate namespace for the overlay layer (the public IP addresses) and the network substrate 1610 layer (the local IP addresses). Packets in the overlay layer may be checked against a mapping directory (e.g., provided by mapping service 1630) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1630) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 16, an example overlay network tunnel 1634A from a virtual machine (VM) 1624A (of VMs 1624A1-1624A4, via VMM 1622A) on host 1620A to a device on the intermediate network 1650 and an example overlay network tunnel 1634B between a VM 1624A (of VMs 1624A1-1624A4, via VMM 1622A) on host 1620A and a VM 1624B (of VMs 1624B1-1624B4, via VMM 1622B) on host 1620B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 16, at least some networks in which embodiments may be implemented may include hardware virtualization technology that enables multiple operating systems to run concurrently on a host computer (e.g., hosts 1620A and 1620B of FIG. 16), i.e. as virtual machines (VMs) 1624 on the hosts 1620. The VMs 1624 may, for example, be executed in slots on the hosts 1620 that are rented or leased to customers of a network provider. A hypervisor, or virtual machine monitor (VMM) 1622, on a host 1620 presents the VMs 1624 on the host with a virtual platform and monitors the execution of the VMs 1624. Each VM 1624 may be provided with one or more local IP addresses; the VMM 1622 on a host 1620 may be aware of the local IP addresses of the VMs 1624 on the host. A mapping service 1630 may be aware of (e.g., via stored mapping information 1632) network IP prefixes and IP addresses of routers or other devices serving IP addresses on the local network. This includes the IP addresses of the VMMs 1622 serving multiple VMs 1624. The mapping service 1630 may be centralized, for example on a server system, or alternatively may be distributed among two or more server systems or other devices on the network. A network may, for example, use the mapping service technology and IP tunneling technology to, for example, route data packets between VMs 1624 on different hosts 1620 within the data center 1600 network; note that an interior gateway protocol (IGP) may be used to exchange routing information within such a local network.

In addition, a network such as the provider data center 1600 network (which is sometimes referred to as an autonomous system (AS)) may use the mapping service technology, IP tunneling technology, and routing service technology to route packets from the VMs 1624 to Internet destinations, and from Internet sources to the VMs 1624. Note that an external gateway protocol (EGP) or border gateway protocol (BGP) is typically used for Internet routing between sources and destinations on the Internet. FIG. 16 shows an example provider data center 1600 implementing a network that provides resource virtualization technology and that provides full Internet access via edge router(s) 1614 that connect to Internet transit providers, according to some embodiments. The provider data center 1600 may, for example, provide customers the ability to implement virtual computing systems (VMs 1624) via a hardware virtualization service and the ability to implement virtualized data stores 1616 on storage resources 1618A-1618N via a storage virtualization service.

The data center 1600 network may implement IP tunneling technology, mapping service technology, and a routing service technology to route traffic to and from virtualized resources, for example to route packets from the VMs 1624 on hosts 1620 in data center 1600 to Internet destinations, and from Internet sources to the VMs 1624. Internet sources and destinations may, for example, include computing systems 1670 connected to the intermediate network 1640 and computing systems 1652 connected to local networks 1650 that connect to the intermediate network 1640 (e.g., via edge router(s) 1614 that connect the network 1650 to Internet transit providers). The provider data center 1600 network may also route packets between resources in data center 1600, for example from a VM 1624 on a host 1620 in data center 1600 to other VMs 1624 on the same host or on other hosts 1620 in data center 1600.

A service provider that provides data center 1600 may also provide additional data center(s) 1660 that include hardware virtualization technology similar to data center 1600 and that may also be connected to intermediate network 1640. Packets may be forwarded from data center 1600 to other data centers 1660, for example from a VM 1624 on a host 1620 in data center 1600 to another VM on another host in another, similar data center 1660, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1618A-1618N, as virtualized resources to customers of a network provider in a similar manner.

Figure 17:
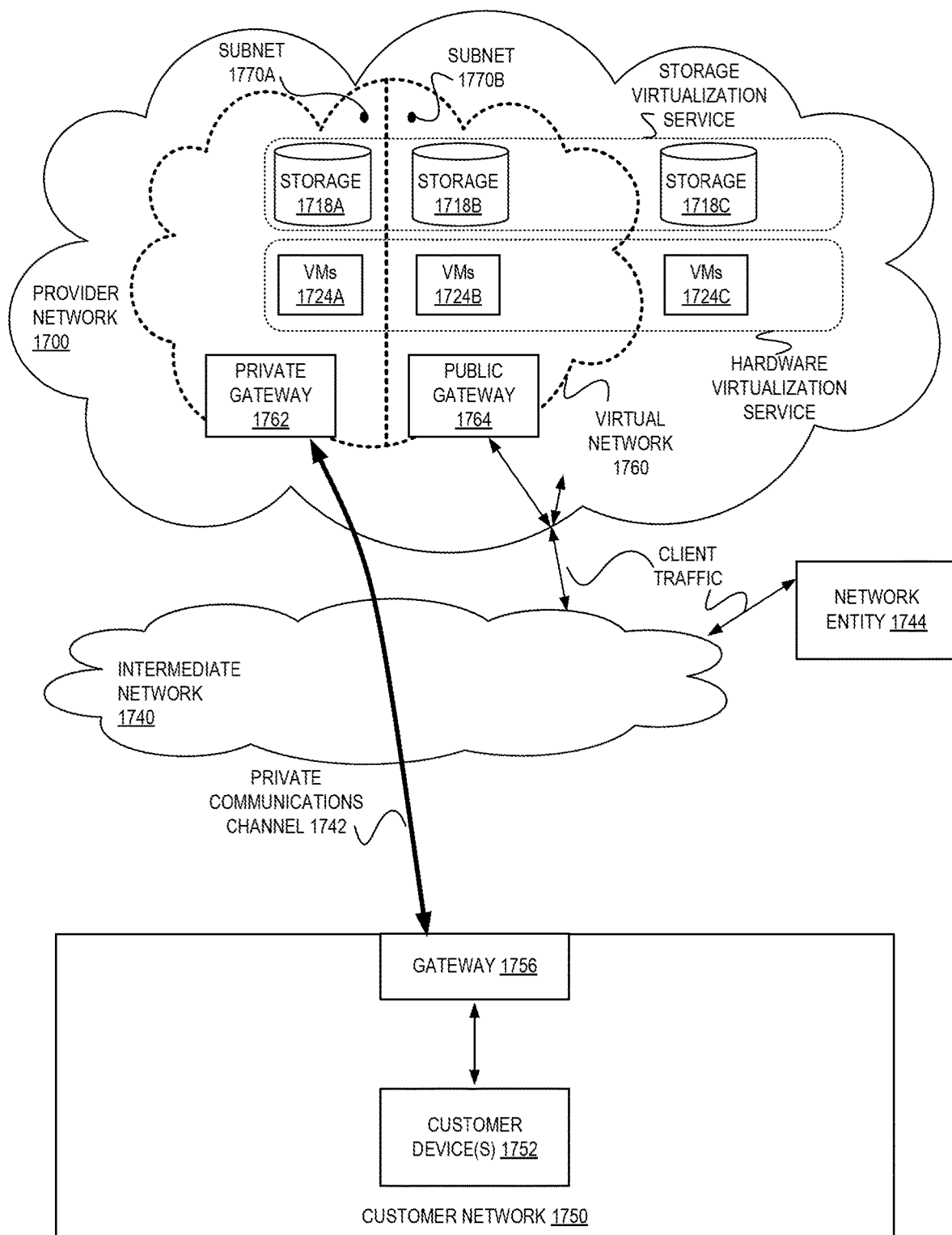
FIG. 17 illustrates an example provider network that provides virtual networks on the provider network to at least some customers according to some embodiments.

FIG. 17 illustrates an example provider network that provides virtual networks on the provider network to at least some customers, according to some embodiments. A customer's virtual network 1760 on a provider network 1700, for example, enables a customer to connect their existing infrastructure (e.g., one or more customer devices 1752) on customer network 1750 to a set of logically isolated resource instances (e.g., VMs 1724A and 1724B and storage 1718A and 1718B), and to extend management capabilities such as security services, firewalls, and intrusion detection systems to include their resource instances.

A customer's virtual network 1760 may be connected to a customer network 1750 via a private communications channel 1742. A private communications channel 1742 may, for example, be a tunnel implemented according to a network tunneling technology or some other technology over an intermediate network 1740. The intermediate network may, for example, be a shared network or a public network such as the Internet. Alternatively, a private communications channel 1742 may be implemented over a direct, dedicated connection between virtual network 1760 and customer network 1750.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 1760 for a customer on provider network 1700, one or more resource instances (e.g., VMs 1724A and 1724B and storage 1718A and 1718B) may be allocated to the virtual network 1760. Note that other resource instances (e.g., storage 1718C and VMs 1724C) may remain available on the provider network 1700 for other customer usage. A range of public IP addresses may also be allocated to the virtual network 1760. In addition, one or more networking nodes (e.g., routers, switches, etc.) of the provider network 1700 may be allocated to the virtual network 1760. A private communications channel 1742 may be established between a private gateway 1762 at virtual network 1760 and a gateway 1756 at customer network 1750.

In some embodiments, in addition to, or instead of, a private gateway 1762, virtual network 1760 may include a public gateway 1764 that enables resources within virtual network 1760 to communicate directly with entities (e.g., network entity 1744) via intermediate network 1740, and vice versa, instead of or in addition to via private communications channel 1742.

Virtual network 1760 may be, but is not necessarily, subdivided into two or more subnetworks, or subnets, 1770. For example, in implementations that include both a private gateway 1762 and a public gateway 1764, a virtual network 1760 may be subdivided into a subnet 1770A that includes resources (VMs 1724A and storage 1718A, in this example) reachable through private gateway 1762, and a subnet 1770B that includes resources (VMs 1724B and storage 1718B, in this example) reachable through public gateway 1764.

The customer may assign particular customer public IP addresses to particular resource instances in virtual network

1760. A network entity 1744 on intermediate network 1740 may then send traffic to a public IP address published by the customer; the traffic is routed, by the provider network 1700, to the associated resource instance. Return traffic from the resource instance is routed, by the provider network 1700, back to the network entity 1744 over intermediate network 1740. Note that routing traffic between a resource instance and a network entity 1744 may require network address translation to translate between the public IP address and the local IP address of the resource instance.

Some embodiments may allow a customer to remap public IP addresses in a customer's virtual network 1760 as illustrated in FIG. 17 to devices on the customer's external network 1750. When a packet is received (e.g., from network entity 1744), the network 1700 may determine that the destination IP address indicated by the packet has been remapped to an endpoint on external network 1750 and handle routing of the packet to the respective endpoint, either via private communications channel 1742 or via the intermediate network 1740. Response traffic may be routed from the endpoint to the network entity 1744 through the provider network 1700, or alternatively may be directly routed to the network entity 1744 by the customer network 1750. From the perspective of the network entity 1744, it appears as if the network entity 1744 is communicating with the public IP address of the customer on the provider network 1700. However, the network entity 1744 has actually communicated with the endpoint on customer network 1750.

While FIG. 17 shows network entity 1744 on intermediate network 1740 and external to provider network 1700, a network entity may be an entity on provider network 1700. For example, one of the resource instances provided by provider network 1700 may be a network entity that sends traffic to a public IP address published by the customer.

Figure 18:
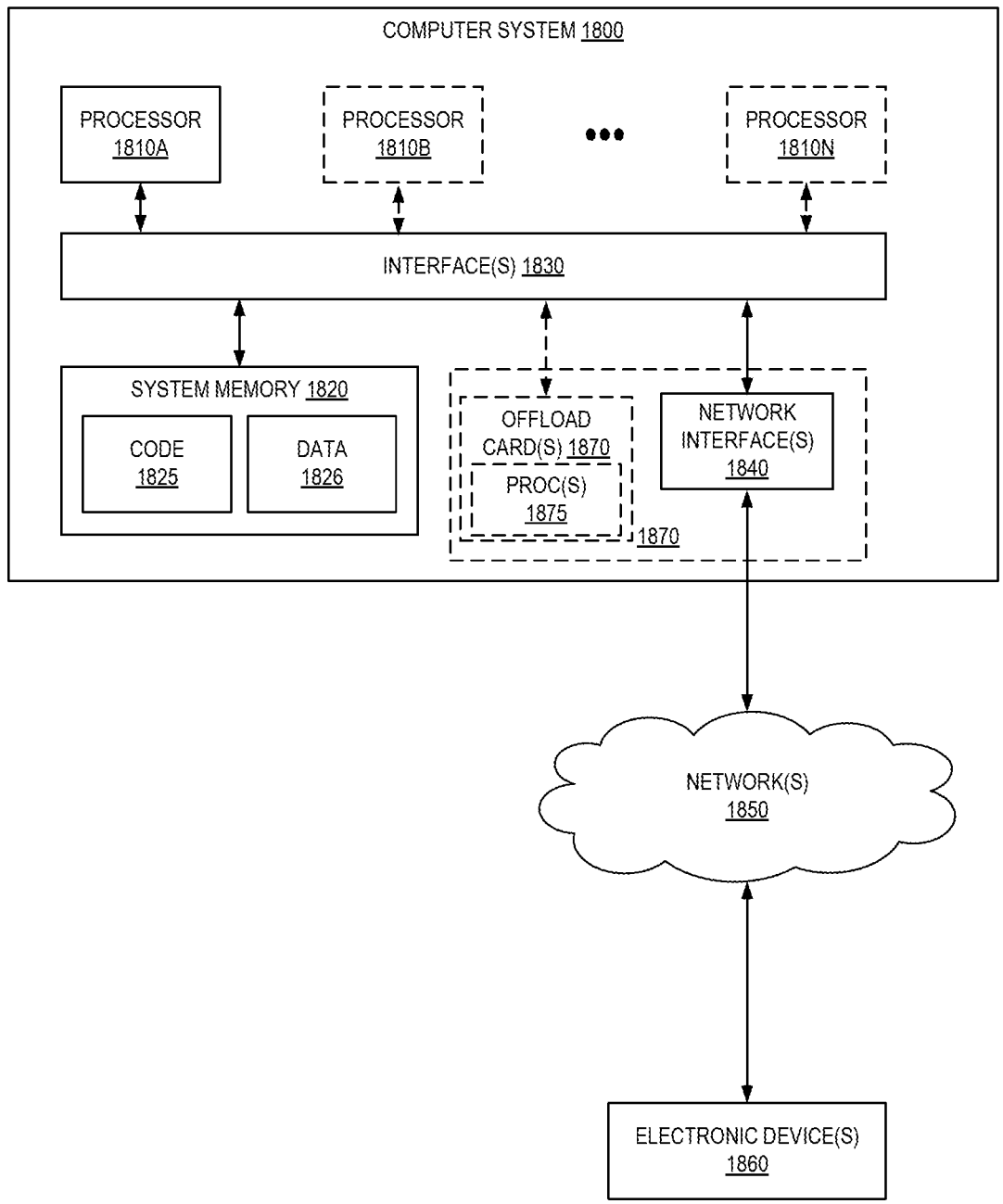
FIG. 18 is a block diagram illustrating an example computer system that may be used in some embodiments.

In some embodiments, a system that implements a portion or all of the techniques as described herein may include a general-purpose computer system that includes or is configured to access one or more computer-accessible media, such as computer system 1800 illustrated in FIG. 18. In the illustrated embodiment, computer system 1800 includes one or more processors 1810 coupled to a system memory 1820 via an input/output (I/O) interface 1830. Computer system 1800 further includes a network interface 1840 coupled to I/O interface 1830. While FIG. 18 shows computer system 1800 as a single computing device, in various embodiments a computer system 1800 may include one computing device or any number of computing devices configured to work together as a single computer system 1800.

In various embodiments, computer system 1800 may be a uniprocessor system including one processor 1810, or a multiprocessor system including several processors 1810 (e.g., two, four, eight, or another suitable number). Processors 1810 may be any suitable processors capable of executing instructions. For example, in various embodiments, processors 1810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1810 may commonly, but not necessarily, implement the same ISA.

System memory 1820 may store instructions and data accessible by processor(s) 1810. In various embodiments, system memory 1820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1820 as code 1825 and data 1826.

In one embodiment, I/O interface 1830 may be configured to coordinate I/O traffic between processor 1810, system memory 1820, and any peripheral devices in the device, including network interface 1840 or other peripheral interfaces. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to system memory 1820, may be incorporated directly into processor 1810.

Network interface 1840 may be configured to allow data to be exchanged between computer system 1800 and other devices 1860 attached to a network or networks 1850, such as other computer systems or devices as illustrated in FIG. 1, for example. In various embodiments, network interface 1840 may support communication via any suitable wired or wireless general data networks, such as types of Ethernet network, for example. Additionally, network interface 1840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1800 includes one or more offload cards 1870 (including one or more processors 1875, and possibly including the one or more network interfaces 1840) that are connected using an I/O interface 1830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1800 may act as a host electronic device (e.g., operating as part of a hardware virtualization service) that hosts compute instances, and the one or more offload cards 1870 execute a virtualization manager that can manage compute instances that execute on the host electronic device. As an example, in some embodiments the offload card(s) 1870 can perform compute instance management operations such as pausing and/or un-pausing compute instances, launching and/or terminating compute instances, performing memory transfer/copying operations, etc. These management operations may, in some embodiments, be performed by the offload card(s) 1870 in coordination with a hypervisor (e.g., upon a request from a hypervisor) that is executed by the other processors 1810A-1810N of the computer system 1800. However, in some embodiments the virtualization manager implemented by the offload card(s) 1870 can accommodate requests from other entities (e.g., from compute instances themselves), and may not coordinate with (or service) any separate hypervisor.

In some embodiments, system memory 1820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1800 via I/O interface 1830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1800 as system memory 1820 or another type of memory. Further, a computer-accessible medium may include transmission media or signals such as electrical, electromagnetic, or digital signals, conveyed via a communication medium such as a network and/or a wireless link, such as may be implemented via network interface 1840.

Figure 19:
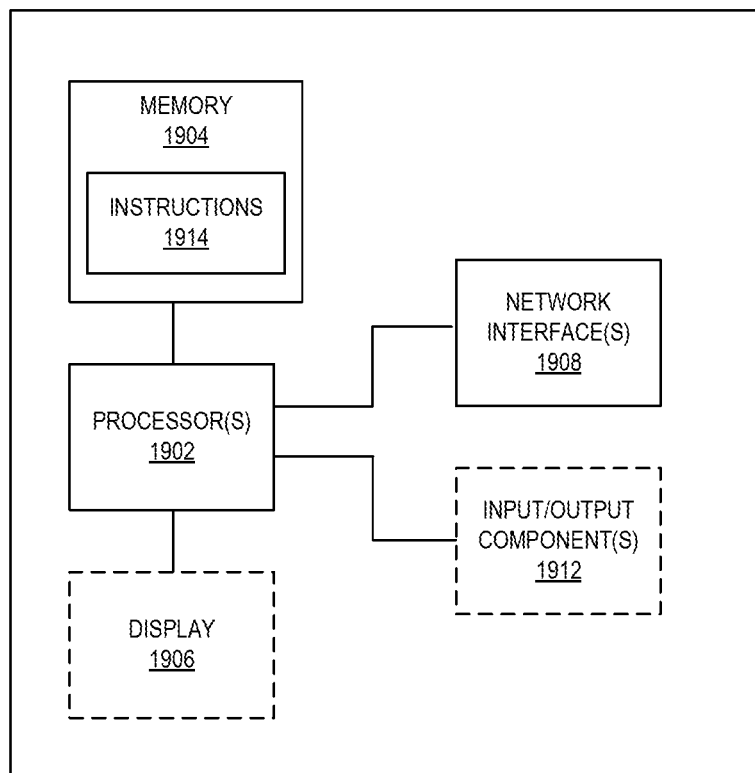
FIG. 19 illustrates a logical arrangement of a set of general components of an exemplary computing device that can be utilized in accordance with various embodiments.

FIG. 19 illustrates a logical arrangement of a set of general components of an example computing device 1900 such as a web services provider, etc. Generally, a computing device 1900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1904) to store code (e.g., instructions 1914) and/or data, and a set of one or more wired or wireless network interfaces 1908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1904) of a given electronic device typically stores code (e.g., instructions 1914) for execution on the set of one or more processors 1902 of that electronic device. One or more parts of various embodiments may be implemented using different combinations of software, firmware, and/or hardware.

A computing device 1900 can include some type of display element 1906, such as a touch screen or liquid crystal display (LCD), although many devices such as portable media players might convey information via other means, such as through audio speakers, and other types of devices such as server end stations may not have a display element 1906 at all. As discussed, some computing devices used in some embodiments include at least one input and/or output component(s) 1912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 20:
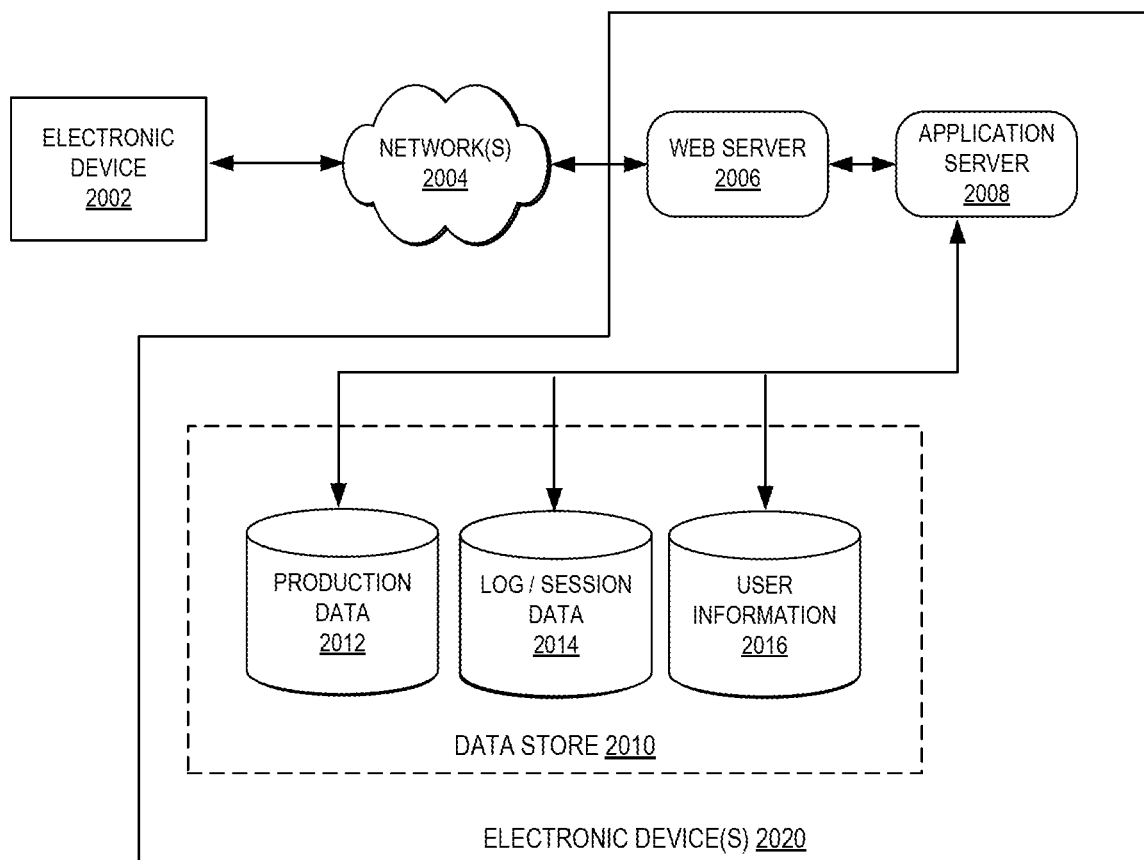
FIG. 20 illustrates an example of an environment for implementing aspects in accordance with various embodiments.

As discussed, different approaches can be implemented in various environments in accordance with the described embodiments. For example, FIG. 20 illustrates an example of an environment 2000 for implementing aspects in accordance with various embodiments. For example, in some embodiments requests are HyperText Transfer Protocol (HTTP) requests that are received by a web server (e.g., web server 2006), and the users, via electronic devices, may interact with the provider network via a web portal provided via the web server 2006 and application server 2008. As will be appreciated, although a web-based environment is used for purposes of explanation, different environments may be used, as appropriate, to implement various embodiments. The system includes an electronic client device 2002, which may also be referred to as a client device and can be any appropriate device operable to send and receive requests, messages or information over an appropriate network 2004 and convey information back to a user of the device 2002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 2004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 2004 includes the Internet, as the environment includes a web server 2006 for receiving requests and serving content in response thereto, although for other networks an alternative device serving a similar purpose could be used, as would be apparent to one of ordinary skill in the art.

The illustrative environment includes at least one application server 2008 and a data store 2010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 2008 can include any appropriate hardware and software for integrating with the data store 2010 as needed to execute aspects of one or more applications for the client device 2002 and handling a majority of the data access and business logic for an application. The application server 2008 provides access control services in cooperation with the data store 2010 and is able to generate content such as text, graphics, audio, video, etc., to be transferred to the client device 2002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 2002 and the application server 2008, can be handled by the web server 2006. It should be understood that the web server 2006 and application server 2008 are not required and are merely example components, as structured code discussed herein can be executed on any appropriate device or host machine as discussed elsewhere herein.

The data store 2010 can include several separate data tables, databases, or other data storage mechanisms and media for storing data relating to a particular aspect. For example, the data store illustrated includes mechanisms for storing production data 2012 and user information 2016, which can be used to serve content for the production side. The data store 2010 also is shown to include a mechanism for storing log or session data 2014. It should be understood that there can be many other aspects that may need to be stored in the data store, such as page image information and access rights information, which can be stored in any of the above listed mechanisms as appropriate or in additional mechanisms in the data store 2010. The data store 2010 is operable, through logic associated therewith, to receive instructions from the application server 2008 and obtain, update, or otherwise process data in response thereto. In one example, a user might submit a search request for a certain type of item. In this case, the data store 2010 might access the user information 2016 to verify the identity of the user and can access a production data 2012 to obtain information about items of that type. The information can then be returned to the user, such as in a listing of results on a web page that the user is able to view via a browser on the user device 2002. Information for a particular item of interest can be viewed in a dedicated page or window of the browser.

The web server 2006, application server 2008, and/or data store 2010 may be implemented by one or more electronic devices 2020, which can also be referred to as electronic server devices or server end stations, and may or may not be located in different geographic locations. Each of the one or more electronic devices 2020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction of the environment 2000 in FIG. 20 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Exemplary embodiments include, but are not limited to the following.

Example 1

A computer-implemented method, comprising: receiving, in a multi-tenant web services provider, an application instance configuration, an application of the application instance to utilize a portion of an attached graphics processing unit (GPU) during execution of a machine learning model and the application instance configuration including: an indication of the central processing unit (CPU) capability to be used, an arithmetic precision of the machine learning model to be used, an indication of the GPU capability to be used, a storage location of the application, and an indication of an amount of random access memory to use; provisioning the application instance and the portion of the GPU attached to the application instance, wherein the application instance is implemented using a physical compute instance in a first instance location, wherein the portion of the GPU is implemented using a physical GPU in the second location, and wherein the physical GPU is accessible to the physical compute instance over a network; attaching the portion of the GPU to the application instance; loading the machine learning model onto the attached portion of the GPU; and performing inference using the loaded machine learning model of the application using the portion of the GPU on the attached GPU.

Example 2

The method of example 1, wherein the application instance and the portion of the attached GPU are within different virtual networks.

Example 3

The method of example 1, wherein the machine learning model includes a description of a computation graph for inference and weights obtained from training.

Example 4

The method of example 1, wherein the machine learning model is in TensorFlow, MXNet, or ONNX format.

Example 5

A computer-implemented method, comprising: receiving, in a multi-tenant web services provider, an application instance configuration, an application of the application instance to utilize a portion of an attached accelerator during execution of a machine learning model and the application instance configuration including: an indication of the central processing unit (CPU) capability to be used, an arithmetic precision of the machine learning model to be used, an indication of the accelerator capability to be used, a storage location of the application, and an indication of an amount of random access memory to use; provisioning the application instance and the portion of the accelerator attached to the application instance, wherein the application instance is implemented using a physical compute instance in a first instance location, wherein the portion of the accelerator is implemented using a physical accelerator in the second location, and wherein the physical accelerator is accessible to the physical compute instance over a network; attaching the portion of the accelerator to the application instance; loading the machine learning model onto the attached portion of the accelerator; and performing inference using the loaded machine learning model of the application using the portion of the accelerator on the attached accelerator.

Example 6

The method of example 5, wherein the machine learning model includes a description of a computation graph for inference and weights obtained from training.

Example 7

The method of example 5, wherein the machine learning model is in a TensorFlow, MXNet, or ONNX format.

Example 8

The method of example 5, wherein the application instance and the portion of the attached accelerator are within different virtual networks.

Example 9

The method of example 5, wherein the accelerator is one of a plurality of accelerators of an accelerator appliance.

Example 10

The method of example 9, wherein the accelerator appliance includes accelerators of different capabilities.

Example 11

The method of example 10, wherein a central processing unit of the accelerator appliance is shared proportional to capabilities of the plurality of accelerators.

Example 12

The method of example 5, further comprising: deattaching the portion of an attached accelerator; and migrating the machine learning model to a different portion of the attached accelerator.

Example 13

The method of example 5, further comprising: deattaching the portion of an attached accelerator; and migrating the machine learning model to a portion of a different accelerator.

Example 14

The method of example 11, further comprising: prior performing inference using the loaded machine learning model of the application using the portion of the accelerator on the attached accelerator, determining an inference engine to use based on the loaded machine learning model.

Example 15

The method of example 14, wherein the inference engine is compatible with the version number of the machine learning model format.

Example 16

A system comprising: storage to store an application, the application including a machine learning model; and an elastic inference service implemented by a second one or more electronic devices, the elastic inference service including an application instance and an accelerator appliance, the elastic inference service to: receive a configuration for the application instance, the application of the application instance to utilize a portion of an attached accelerator of the accelerator appliance during execution of the machine learning model and the application instance configuration including: an indication of the central processing unit (CPU) capability to be used, an arithmetic precision of the machine learning model to be used, an indication of the accelerator capability to be used, a storage location of the application, and an indication of an amount of random access memory to use; provision the application instance and the portion of the accelerator attached to the application instance, wherein the application instance is implemented using a physical compute instance in a first instance location, wherein the portion of the accelerator is implemented using a physical accelerator in the second location, and wherein the physical accelerator is accessible to the physical compute instance over a network; attach the portion of the accelerator to the application instance; load the machine learning model onto the attached portion of the accelerator; and perform inference using the loaded machine learning model of the application using the portion of the accelerator on the attached accelerator.

Example 17

The system of example 16, wherein the elastic inference service is to deattach the portion of an attached accelerator and migrate the machine learning model to a different portion of the attached accelerator.

Example 18

The system of example 16, wherein the elastic inference service is to deattach the portion of an attached accelerator and migrate the machine learning model to a different accelerator.

Example 19

The system of example 16, wherein the machine learning model includes a description of a computation graph for inference and weights obtained from training.

Example 20

The system of example 16, wherein the machine learning model is in a TensorFlow, MXNet, or ONNX format.

Example 21

A computer-implemented method, comprising: attaching a first set of one or more graphical processing unit (GPU) slots of an accelerator appliance to an application instance of a multi-tenant provider network according to an application instance configuration, the application instance configuration to define per GPU slot capabilities to be used by an application of the application instance, wherein the multi-tenant provider network comprises a plurality of computing devices configured to implement a plurality of virtual compute instances, and wherein the first set of one or more GPU slots is implemented using physical GPU resources accessible to the application instance over a network; loading the machine learning model onto the first set of one or more GPU slots; and while performing inference using the loaded machine learning model of the application using the first set of one or more GPU slots on the attached accelerator appliance, managing resources of the accelerator appliance using an accelerator appliance manager of the accelerator appliance.

Example 22

The method of example 21, wherein the accelerator appliance includes at least on GPU and at least one other type of accelerator.

Example 23

The method of example 21, further comprising: while attaching a set of one or more GPU slots of the accelerator appliance to an application instance, updating at least one software version used by the GPU slot to be compatible with the machine learning model.

Example 24

The method of example 21, further comprising: replacing the first set of one or more GPU slots with a second set of one or more GPU slots for the application instance; migrating processing for the application instance from the first set of one or more GPU slots to the second set of one or more GPU slots; and executing an application using the second set of one or more GPU slots.

Example 25

A computer-implemented method, comprising: attaching a first set of one or more accelerator slots of an accelerator appliance to an application instance of a multi-tenant provider network according to an application instance configuration, the application instance configuration to define per accelerator slot capabilities to be used by an application of the application instance, wherein the multi-tenant provider network comprises a plurality of computing devices configured to implement a plurality of virtual compute instances, and wherein the first set of one or more accelerator slots is implemented using physical accelerator resources accessible to the application instance; loading the machine learning model onto the first set of one or more accelerator slots; and while performing inference using the loaded machine learning model of the application using the first set of one or more accelerator slots on the attached accelerator appliance, managing resources of the accelerator appliance using an accelerator appliance manager of the accelerator appliance.

Example 26

The method of example 25, wherein managing resources of the accelerator appliance includes managing a central processing unit, memory, and ingress network bandwidth.

Example 27

The method of example 25, wherein managing resources of the accelerator appliance includes spatially multiplexing one or more accelerator slots.

Example 28

The method of example 25, wherein managing resources of the accelerator appliance includes temporally multiplexing a tensor processing block into a single accelerator slot.

Example 29

The method of example 25, further comprising: updating at least one software version used by the accelerator slot.

Example 30

The method of example 25, further comprising: replacing the first set of one or more accelerator slots with a second set of one or more accelerator slots for the application instance; migrating processing for the application instance from the first set of one or more accelerator slots to the second set of one or more accelerator slots; and executing the application using the second set of one or more accelerator slots.

Example 31

The method of example 30, wherein the first set of one or more accelerator slots are replaced with the second set of one or more accelerator slots for the application instance due to a change in requirements.

Example 32

The method of example 31, wherein the change in requirements is specified by a user of the application instance.

Example 33

The method of example 30, wherein the first set of one or more accelerator slots are replaced with the second set of one or more accelerator slots for the application instance due to a degradation of performance.

Example 34

The method of example 30, wherein the second set of one or more accelerator slots provides a different level of processing relative to the first set of one or more accelerator slots.

Example 35

The method of example 30, wherein replacing the first set of one or more accelerator slots with the second set of one or more accelerator slots comprises causing the second set of one more accelerator slots to assume operation in place of the first set of one more accelerator slots.

Example 36

The method of example 25, wherein the accelerator appliance includes accelerators of different capabilities.

Example 37

A system comprising: storage to store an application, the application including a machine learning model; and an elastic inference service implemented by a second one or more electronic devices, the elastic inference service including an application instance and an accelerator appliance, the elastic inference service to: attach a first set of one or more accelerator slots of the accelerator appliance to the application instance of a multi-tenant provider network according to an application instance configuration, the application instance configuration to define per accelerator slot capabilities to be used by an application of the application instance, wherein the multi-tenant provider network comprises a plurality of computing devices configured to implement a plurality of virtual compute instances, and wherein the first set of one or more accelerator slots is implemented using physical accelerator resources accessible to the application instance; load the machine learning model onto the first set of one or more accelerator slots; and while performing inference using the loaded machine learning model of the application using the first set of one or more accelerator slots on the attached accelerator appliance, manage resources of the accelerator appliance using an accelerator appliance manager of the accelerator appliance.

Example 38

The system of example 37, wherein to manage resources of the accelerator appliance is to include to manage a central processing unit, memory, and ingress network bandwidth.

Example 39

The system of example 37, wherein the elastic inference service is further to: replace the first set of one or more accelerator slots with a second set of one or more accelerator slots for the application instance, migrate processing for the application instance from the first set of one or more accelerator slots to the second set of one or more accelerator slots, and executing the application using the second set of one or more accelerator slots.

Example 40

The system of example 39, wherein the first set of one or more accelerator slots are replaced with the second set of one or more accelerator slots for the application instance due to a degradation of performance.

Example 41

A computer-implemented method, comprising: receiving, in a multi-tenant web services provider, an application instance configuration, an application of the application instance to utilize a portion of an attached graphics processing unit (GPU) during execution of a machine learning model and the application instance configuration including an arithmetic precision of the machine learning model to be used in determining the portion of the GPU to provision; provisioning the application instance and the portion of the GPU attached to the application instance, wherein the application instance is implemented using a physical compute instance in a first instance location, wherein the portion of the GPU is implemented using a physical GPU in the second location, and wherein the physical GPU is accessible to the physical compute instance over a network; loading the machine learning model onto the portion of the GPU; and performing inference using the loaded machine learning model of the application using the portion of the GPU on the attached GPU.

Example 42

The method of example 41, further comprising: prior to provisioning the portion of the accelerator, evaluating the machine learning model to determine the arithmetic precision of the machine learning model.

Example 43

The method of example 41, further comprising: profiling the machine learning model by converting to an intermediate representation having GPU -independent optimization and converting from the intermediate representation to machine code with GPU -dependent optimizations.

Example 44

The method of example 41, further comprising: selecting a GPU location for a physical accelerator or an application instance location based at least in part on one or more placement criteria, wherein the multi-tenant web services provider comprises a plurality of instance locations for physical compute instances and a plurality of GPU locations for physical accelerators.

Example 45

A computer-implemented method, comprising: receiving, in a multi-tenant web services provider, an application instance configuration, an application of the application instance to utilize a portion of an attached accelerator during execution of a machine learning model and the application instance configuration including an arithmetic precision of the machine learning model to be used in determining the portion of the accelerator to provision; provisioning the application instance and the portion of the accelerator attached to the application instance, wherein the application instance is implemented using a physical compute instance in a first location, wherein the portion of the accelerator is implemented using a physical accelerator in the second location, and wherein the physical accelerator is accessible to the physical compute instance; loading the machine learning model onto the portion of the accelerator; and performing inference using the loaded machine learning model of the application using the portion of the accelerator on the attached accelerator.

Example 46

The method of example 45, wherein the machine learning model includes a description of a computation graph for inference and weights obtained from training.

Example 47

The method of example 45, further comprising: prior to provisioning the portion of the accelerator, evaluating the machine learning model to determine the arithmetic precision of the machine learning model.

Example 48

The method of example 45, further comprising: profiling the machine learning model by converting to an intermediate representation having accelerator-independent optimization and converting from the intermediate representation to machine code with accelerator -dependent optimizations.

Example 49

The method of example 45, further comprising: in the application, aggregating calls to the portion of the accelerator and sending the aggregated calls as a batch.

Example 50

The method of example 45, further comprising: prior to attaching the accelerator, selecting the accelerator based on computational capability of the accelerator.

Example 51

The method of example 45, further comprising: selecting an accelerator location for a physical accelerator or an application instance location based at least in part on one or more placement criteria, wherein the multi-tenant web services provider comprises a plurality of instance locations for physical compute instances and a plurality of accelerator locations for physical accelerators.

Example 52

The method of example 41, wherein the one or more placement criteria comprise improvement of one or more metrics.

Example 53

The method of example 51, wherein the one or more placement criteria are based at least in part on a performance metric associated with use of the physical accelerator by the physical compute instance.

Example 54

The method of example 51, wherein the one or more placement criteria are based at least in part on an energy metric associated with use of the physical accelerator by the physical compute instance.

Example 55

The method of example 51, wherein the accelerator location or the application instance location is selected based at least in part on network locality.

Example 56

The method of example 51, wherein the accelerator location is selected based at least in part on network latency between the physical accelerator and a client device.

Example 57

A system comprising: storage to store an application, the application including a machine learning model; and an elastic inference service implemented by a second one or more electronic devices, the elastic inference service including an application instance and an accelerator appliance, the elastic inference service to: receive, in a multi-tenant web services provider, an application instance configuration, an application of the application instance to utilize a portion of an attached accelerator during execution of a machine learning model and the application instance configuration including an arithmetic precision of the machine learning model to be used in determining the portion of the accelerator to provision; provision the application instance and the portion of the accelerator attached to the application instance, wherein the application instance is implemented using a physical compute instance in a first location, wherein the portion of the accelerator is implemented using a physical accelerator in the second location, and wherein the physical accelerator is accessible to the physical compute instance; load the machine learning model onto the portion of the accelerator; and perform inference using the loaded machine learning model of the application using the portion of the accelerator on the attached accelerator.

Example 58

The system of example 57, wherein the elastic inference service is to profile the machine learning model by converting to an intermediate representation having accelerator-independent optimization and converting from the intermediate representation to machine code with accelerator -dependent optimizations.

Example 59

The system of example 57, wherein the elastic inference service is to select an accelerator location for a physical accelerator or an application instance location based at least in part on one or more placement criteria, wherein the multi-tenant web services provider comprises a plurality of instance locations for physical compute instances and a plurality of accelerator locations for physical accelerators.

Example 60

The system of example 57, wherein the elastic inference service is to the accelerator location or the application instance location is selected based at least in part on network locality.

Example 61

A computer-implemented method, comprising: receiving, in a multi-tenant web services provider, an application instance configuration, an application of the application instance to utilize a plurality of portions of at least one attached graphics processing unit (GPU) during execution of a machine learning model; provisioning the application instance and the portions of the at least one GPU attached to the application instance; loading the machine learning model onto the portions of the at least one GPU; receiving scoring data in the application; and utilizing each of the portions of the attached at least one GPU to perform inference on the scoring data in parallel and only using one response from the portions of the GPU.

Example 62

The method of example 61, wherein the one response to use is a temporally first response.

Example 63

The method of example 61, further comprising: tracking timing of each of response from the portions of the attached at least one GPU; and altering the provisioning of the plurality of portions of at least one GPU based on the tracked timing.

Example 64

A computer-implemented method, comprising: provisioning an application instance and portions of at least one accelerator attached to the application instance to execute a machine learning model of an application of the application instance; loading the machine learning model onto the portions of the at least one accelerator; receiving scoring data in the application; and utilizing each of the portions of the attached at least one accelerator to perform inference on the scoring data in parallel and only using one response from the portions of the accelerator.

Example 65

The method of example 64, wherein the machine learning model includes a description of a computation graph for inference and weights obtained from training.

Example 66

The method of example 64, wherein the one response to use is a temporally first response.

Example 67

The method of example 64, further comprising: tracking timing of each of response from the portions of the attached at least one accelerator; and altering the provisioning of the plurality of portions of at least one accelerator based on the tracked timing.

Example 68

The method of example 64, wherein the altering the provisioning of the plurality of portions of at least one accelerator based on the tracked timing is performed, at least in part, by launching at least one different accelerator slot and terminating an underperforming accelerator slot.

Example 69

The method of example 64, further comprising: receiving an application instance configuration, the application instance configuration to indicate the use of altering the provisioning of the plurality of portions of at least one accelerator based on the tracked timing.

Example 70

The method of example 64, further comprising: prior to attaching the accelerator, selecting the accelerator based on computational capability of the accelerator.

Example 71

The method of example 64, further comprising: selecting an accelerator location for a physical accelerator or an application instance location based at least in part on one or more placement criteria, wherein the multi-tenant web services provider comprises a plurality of instance locations for physical compute instances and a plurality of accelerator locations for physical accelerators;

Example 72

The method of example 71, wherein the one or more placement criteria are based at least in part on a performance metric associated with use of the physical accelerator by the physical compute instance.

Example 73

The method of example 71, wherein the accelerator location or the application instance location is selected based at least in part on network locality.

Example 74

The method of example 71, wherein the accelerator location is selected based at least in part on network latency between the physical accelerator and a client device.

Example 75

A system comprising: storage to store an application, the application including a machine learning model; and an elastic inference service implemented by a second one or more electronic devices, the elastic inference service including an application instance and an accelerator appliance, the elastic inference service to: provision an application instance and portions of at least one accelerator attached to the application instance to execute a machine learning model of an application of the application instance; load the machine learning model onto the portions of the at least one accelerator; receive scoring data in the application; and utilize each of the portions of the attached at least one accelerator to perform inference on the scoring data in parallel and only using one response from the portions of the accelerator.

Example 76

The system of example 75, wherein the one response to use is a temporally first response.

Example 77

The system of example 75, wherein the elastic inference service is further to track timing of each of response from the portions of the attached at least one accelerator and altering the provisioning of the plurality of portions of at least one accelerator based on the tracked timing.

Example 78

The system of example 76, wherein the altering of the provisioning of the plurality of portions of at least one accelerator based on the tracked timing is performed, at least in part, by launching at least one different accelerator slot and terminating an underperforming accelerator slot.

Example 79

The system of example 75, wherein the elastic inference service is further to receive an application instance configuration, the application instance configuration to indicate the use of altering the provisioning of the plurality of portions of at least one accelerator based on the tracked timing.

Example 80

The system of example 75, wherein the elastic inference service is further to, prior to attaching the accelerator, select the accelerator based on computational capability of the accelerator.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

We claim:

1. A computer-implemented method, comprising:
   receiving, in a multi-tenant web services provider, an application instance configuration, wherein an application of the application instance is to utilize portions of at least one attached graphics processing unit (GPU) during execution of a machine learning model;
   provisioning the application instance and the portions of the at least one GPU attached to the application instance;
   loading the machine learning model onto the portions of the at least one GPU;
   receiving scoring data in the application;
   utilizing each of the portions of the attached at least one GPU to perform inference on the scoring data in parallel and only using one response from the portions of the GPU;
   tracking a timing of responses from the portions of the attached at least one GPU; and
   altering the provisioning of the portions of at least one GPU based on the tracked timing.

2. The method of claim 1, wherein the one response to use is a temporally first response.

3. A computer-implemented method, comprising:
   provisioning an application instance and portions of at least one accelerator attached to the application instance to execute a machine learning model of an application of the application instance;
   loading the machine learning model onto the portions of the at least one accelerator;
   receiving scoring data in the application;
   utilizing each of the portions of the attached at least one accelerator to perform inference on the scoring data in parallel and only using one response from the portions of the accelerator;
   tracking a timing of responses from the portions of the attached at least one accelerator; and
   altering the provisioning of the portions of at least one accelerator based on the tracked timing.

4. The method of claim 3, wherein the machine learning model includes a description of a computation graph for inference and weights obtained from training.

5. The method of claim 3, wherein the one response to use is a temporally first response.

6. The method of claim 3, wherein the altering the provisioning of the portions of at least one accelerator based on the tracked timing is performed, at least in part, by launching at least one different accelerator slot and terminating an underperforming accelerator slot.

7. The method of claim 3, further comprising:
   receiving an application instance configuration, the application instance configuration to indicate the use of altering the provisioning of the portions of at least one accelerator based on the tracked timing.

8. The method of claim 3, further comprising:
   prior to attaching the accelerator, selecting the accelerator based on computational capability of the accelerator.

9. The method of claim 3, further comprising:
   selecting an accelerator location for a physical accelerator or an application instance location based at least in part on one or more placement criteria, wherein a multi-tenant web services provider comprises a plurality of instance locations for physical compute instances and a plurality of accelerator locations for physical accelerators.

10. The method of claim 9, wherein the one or more placement criteria are based at least in part on a performance metric associated with use of the physical accelerator by the physical compute instance.

11. The method of claim 9, wherein the accelerator location or the application instance location is selected based at least in part on network locality.

12. The method of claim 9, wherein the accelerator location is selected based at least in part on network latency between the physical accelerator and a client device.

13. A system comprising:
   a storage to store an application, the application including a machine learning model; and
   an elastic inference service implemented by one or more electronic devices, the elastic inference service including an application instance and an accelerator appliance, the elastic inference service to:
   provision an application instance and portions of at least one accelerator attached to the application instance to execute the machine learning model of an application of the application instance;
   load the machine learning model onto the portions of the at least one accelerator;
   receive scoring data in the application;
   utilize each of the portions of the attached at least one accelerator to perform inference on the scoring data in parallel and only using one response from the portions of the accelerator;
   track a timing of responses from the portions of the attached at least one accelerator; and
   alter the provisioning of the portions of at least one accelerator based on the tracked timing.

14. The system of claim 13, wherein the one response to use is a temporally first response.

15. The system of claim 13, wherein to alter the provisioning of the portions of the at least one accelerator based on the tracked timing the elastic inference service is, at least in part, to launch at least one different accelerator slot and terminate an underperforming accelerator slot.

16. The system of claim 13, wherein the elastic inference service is further to receive an application instance configuration, the application instance configuration to indicate the use of altering the provisioning of the portions of at least one accelerator based on the tracked timing.

17. The system of claim 13, wherein the elastic inference service is further to, prior to attaching the accelerator, select the accelerator based on computational capability of the accelerator.

\* \* \* \* \*